United States Patent
Schmid et al.

(10) Patent No.: US 6,700,964 B2
(45) Date of Patent: *Mar. 2, 2004

(54) ENCAPSULATION, COMPRESSION AND ENCRYPTION OF PCM DATA

(75) Inventors: Greg Schmid, San Antonio, TX (US); Keith S. Pickens, San Antonio, TX (US); Craig Heilmann, San Antonio, TX (US); Kirk Smith, San Antonio, TX (US)

(73) Assignee: SecureLogix Corporation, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/200,969

(22) Filed: Jul. 23, 2002

(65) Prior Publication Data

US 2003/0016803 A1 Jan. 23, 2003

(Under 37 CFR 1.47)

Related U.S. Application Data

(60) Provisional application No. 60/307,209, filed on Jul. 23, 2001.

(51) Int. Cl.[7] .................................................. H04M 3/00
(52) U.S. Cl. ........................ 379/189; 379/196; 379/198; 379/200
(58) Field of Search ....................... 379/201.01, 102.01, 379/102.02, 102.03, 189, 196, 200, 93.24

(56) References Cited

U.S. PATENT DOCUMENTS

| | | |
|---|---|---|
| 4,332,982 A | 6/1982 | Thomas |
| 4,639,557 A | 1/1987 | Butler et al. .................. 379/29 |
| 4,653,085 A | 3/1987 | Chan et al. .................... 379/94 |
| 4,783,796 A | 11/1988 | Ladd ............................ 379/67 |
| 4,876,717 A | 10/1989 | BarRon et al. ................ 380/25 |
| 4,905,281 A | 2/1990 | Surjaatmadja et al. ........ 380/25 |
| 4,965,459 A | 10/1990 | Murray ........................ 379/189 |
| 5,018,190 A | 5/1991 | Walker et al. ................ 379/95 |
| 5,276,529 A | 1/1994 | Williams ..................... 358/406 |
| 5,276,687 A | 1/1994 | Miyamoto ............... 370/110.1 |
| 5,276,731 A | 1/1994 | Arbel et al. ................... 379/88 |
| 5,311,593 A | 5/1994 | Carmi .......................... 380/23 |
| 5,345,595 A | 9/1994 | Johnson et al. ............. 455/33.1 |
| 5,351,287 A | 9/1994 | Bhattacharyya et al. ...... 379/95 |
| 5,436,957 A | 7/1995 | McConnell ................... 379/88 |
| 5,490,212 A | 2/1996 | Lautenschlager ........... 379/225 |
| 5,495,521 A | 2/1996 | Rangachar ................... 379/95 |
| 5,510,777 A | 4/1996 | Pilc et al. ............... 340/835.31 |
| 5,535,265 A | 7/1996 | Suwandhaputra ............ 379/97 |
| 5,557,742 A | 9/1996 | Smaha et al. ................ 395/186 |
| 5,581,228 A | 12/1996 | Cadieux et al. .......... 340/146.2 |
| 5,606,604 A | 2/1997 | Rosenblatt et al. .......... 379/198 |

(List continued on next page.)

FOREIGN PATENT DOCUMENTS

| | | |
|---|---|---|
| WO | WO96/22000 | 7/1996 |
| WO | WO 98/17072 | 4/1998 |
| WO | WO 98/53635 | 11/1998 |

OTHER PUBLICATIONS http://www.tlogic.com/penetration.html.
http://www.m-tech.ab.ca/security/penetration.
http://www.m-tech.ab.ca/products/secmod/.
http://www.sandstrom.net/phonesweep:*Sandstorm* Enterprises, Inc. "Introducing PhoneSweep".
http://www.bruck-inc.com/html/security/pentesting.htm: "Penetration Test".

*Primary Examiner*—Ahmad F. Matar
*Assistant Examiner*—Rasha S Al-Aubaidi
(74) *Attorney, Agent, or Firm*—Jenkens & Gilchrist, PC

(57) ABSTRACT

A system and method to provide secure access across the untrusted public switched telephone network is described. The system and method can be initiated by a security policy defining actions to be taken based upon at least one attribute of the call.

21 Claims, 32 Drawing Sheets

U.S. PATENT DOCUMENTS

| | | | |
|---|---|---|---|
| 5,623,601 A | 4/1997 | Vu | 395/87.01 |
| 5,627,886 A | 5/1997 | Bowman | 379/111 |
| 5,684,957 A | 11/1997 | Kondo et al. | 395/200.06 |
| 5,706,338 A | 1/1998 | Relyea et al. | 379/189 |
| 5,745,555 A | 4/1998 | Mark | 379/95 |
| 5,805,686 A | 9/1998 | Moller et al. | 379/198 |
| 5,805,803 A | 9/1998 | Birrell et al. | 395/187.01 |
| 5,812,763 A | 9/1998 | Teng | 395/187.01 |
| 5,826,014 A | 10/1998 | Coley et al. | 395/187.01 |
| 5,838,682 A | 11/1998 | Dekelbaum et al. | 370/401 |
| 5,854,889 A | 12/1998 | Liese et al. | 395/183.19 |
| 5,864,613 A | 1/1999 | Flood | 379/188 |
| 5,864,666 A | 1/1999 | Shrader | 395/187.01 |
| 5,892,903 A | 4/1999 | Klaus | 395/187.01 |
| 5,898,830 A | 4/1999 | Wesinger, Jr. et al. | 713/201 |
| 5,907,602 A | 5/1999 | Peel et al. | 379/114 |
| 5,918,019 A | 6/1999 | Valencia | 395/200.57 |
| 5,923,849 A | 7/1999 | Venkatraman | 395/200.54 |
| 5,931,946 A | 8/1999 | Terada et al. | 713/201 |
| 5,944,823 A | 8/1999 | Jade et al. | 713/201 |
| 5,946,386 A | 8/1999 | Rogers et al. | 379/265 |
| 5,949,864 A | 9/1999 | Cox | 379/189 |
| 5,950,195 A | 9/1999 | Stockwell et al. | 707/4 |
| 5,960,177 A | 9/1999 | Tanno | 709/229 |
| 6,021,324 A | 2/2000 | Sizer et al. | 455/403 |
| 6,061,798 A | 5/2000 | Coley et al. | 713/201 |
| 6,098,172 A | 8/2000 | Coss et al. | 713/201 |
| 6,154,775 A | 11/2000 | Coss et al. | 709/225 |
| 6,226,751 B1 | 5/2001 | Arrow et al. | 713/201 |

406

| EXTENSION GROUPS | ELEMENTS | COMMENT |
|---|---|---|
| ACCOUNTING VOICE | 210-402-6701<br>210-402-6702<br>210-402-6703 | ACCOUNTING VOICE EXTENSIONS |
| DAILY RECEIVABLE MODEM | 210-402-8000<br>210-402-8001<br>210-402-8002 | MODEM EXTENSIONS USED ONLY FOR INBOUND CALLS UPLOADING DAILY RECEIPT INFORMATION |
| VIDEO | 210-402-9000 | VTC EXTENSION |
| ENGINEERING VOICE | 210-402-66XX | ENGINEERING VOICE EXTENSIONS |
| ENGINEERING MODEM | 210-402-8004<br>210-402-8005 | APPROVED ENGINEERING DEPT. MODEM EXTENSIONS |
| ENGINEERING FAX | 210-402-7001<br>210-402-7002 | FAX EXTENSIONS USED BY THE ENGINEERING DEPT. |
| ENGINEERING | ENGINEERING VOICE<br>ENGINEERING FAX<br>ENGINEERING MODEM<br>VIDEO | ALL KNOWN AND APPROVED VOICE, FAX, MODEM, AND VTC EXTENSIONS USED BY THE ENGINEERING DEPT. |
| SALES | 210-402-6501<br>210-402-6502<br>210-402-6503 | SALES VOICE EXTENSIONS |
| EXEC STAFF VOICE | 210-402-6801<br>210-402-6802<br>210-402-6803 | ADMINISTRATION VOICE EXTENSIONS |
| EXEC STAFF FAX | 210-402-7003 | FAX EXTENSIONS USED BY EXEC STAFF ONLY |
| EXEC STAFF | EXEC STAFF VOICE<br>EXEC STAFF FAX<br>VIDEO | ALL KNOWN AND APPROVED VOICE, FAX, AND VTC EXTENSIONS USED BY THE EXEC STAFF |
| VOICE-ONLY | SALES<br>ENGINEERING VOICE<br>EXEC STAFF VOICE<br>ACCOUNTING VOICE | ALL VOICE-ONLY EXTENSIONS IN THE SAN ANTONIO FACILITY |
| FAX-ONLY | 210-402-7000<br>210-402-7004<br>210-402-7005<br>ENGINEERING FAX<br>EXEC STAFF FAX | ALL FAX-ONLY EXTENSIONS IN THE SAN ANTONIO FACILITY |

| | DAILY RECEIVABLE MODEM | |
|---|---|---|
| AUTHORIZED MODEM | ENGINEERING MODEM 210-402-8006 210-402-8007 210-402-8008 | KNOWN AND APPROVED MODEM EXTENSIONS |
| BRANCH OFFICES VOICE-ONLY | (ELEMENTS NOT SHOWN) | VOICE-ONLY EXTENSIONS AT BRANCH OFFICES |
| BRANCH OFFICES AUTHORIZED MODEM | (ELEMENTS NOT SHOWN) | APPROVED MODEM EXTENSIONS AT BRANCH OFFICES |
| BRANCH OFFICES FAX-ONLY | (ELEMENTS NOT SHOWN) | FAX EXTENSIONS AT BRANCH OFFICES |
| BRANCH OFFICES VIDEO | (ELEMENTS NOT SHOWN) | VTC EXTENSIONS AT BRANCH OFFICES |
| INTER-BRANCH | BRANCH OFFICES VOICE-ONLY<br><br>BRANCH OFFICES AUTH. MODEM<br><br>BRANCH OFFICES FAX-ONLY<br><br>BRANCH OFFICES VIDEO | ALL KNOWN AND APPROVED VOICE, FAX, MODEM, AND VTC EXTENSIONS USED BY THE BRANCH OFFICES |
| VPSTN NON-SECURE | 210-402-8003 | FAILED VPSTN EXTENSIONS AND LINES--DENY FUTURE CALLS |
| XXX* | XXX* | ANY CALL TO/FROM COUNTRY X BASED ON COUNTRY CODE |

FIG. 6B

| SRB RULE | DIRECTION | SOURCE | DESTINATION | CALL TYPE | ACTION | TRACK | DATE | TIME | INSTALL ON | COMMENT |
|---|---|---|---|---|---|---|---|---|---|---|
| 1 | OUTBOUND | VPSTN NON-SECURE | ANY | ANY | DENY | EMAIL, PAGE, LOG | ANY | ANY | ALL | DENYS OUTBOUND CALL FROM EXTENSION OR LINE FOUND TO BE NON-SECURE |
| 2 | INBOUND | ANY | VPSTN NON-SECURE | ANY | DENY | EMAIL, PAGE, LOG | ANY | ANY | ALL | DENYS INBOUND CALL TO EXTENSION OR LINE FOUND TO BE NON-SECURE |
| 3 | INBOUND | ANY | FAX-ONLY | FAX | ALLOW | SECURE MODE, LOG | ANY | 9PM-6AM | ALL | ALLOWS AND SECURES INBOUND CALL TO FAX-ONLY GROUP BETWEEN 9PM AND 6AM, LOGS CALL |
| 4 | INBOUND | ANY | DAILY RECEIVABLE | MODEM | ALLOW | SECURE MODE, LOG | ANY | ANY | SAN ANTONIO | ALLOWS AND SECURES INBOUND MODEM CALL TO DAILY RECEIVABLE GROUP, LOGS CALL |
| 5 | OUTBOUND | ANY | XXX * | VOICE, FAX, MODEM, VTC | ALLOW | SECURE MODE, LOG | ANY | ANY | ALL | ALLOWS AND SECURES CALL TO COUNTRY X, LOGS CALL |

| | | | | | | | |
|---|---|---|---|---|---|---|---|
| 6 | INBOUND | XXX * | ANY | VOICE, FAX, MODEM, VTC | ALLOW | SECURE MODE, LOG | ANY | ANY | ALL | ALLOWS AND SECURES CALL FROM COUNTRY X, LOGS CALL |
| 7 | ANY | INTER-BRANCH | INTER-BRANCH | VOICE, FAX, MODEM, VTC | ALLOW | SECURE MODE, LOG | ANY | ANY | ALL | ALLOWS AND SECURES INTER-BRANCH CALL, LOGS CALL |
| 8 | OUTBOUND | EXEC STAFF, ENGINEERING | ANY | VOICE, FAX, MODEM, VTC | ALLOW | SECURE MODE, LOG | ANY | ANY | ALL | ALLOWS AND SECURES CALL FROM EXEC STAFF AND ENG. GROUPS, LOGS CALL |
| 9 | INBOUND | ANY | EXEC STAFF, ENGINEERING | VOICE, FAX, MODEM, VTC | ALLOW | SECURE MODE, LOG | ANY | ANY | ALL | ALLOWS AND SECURES CALL TO EXEC STAFF AND ENG. GROUPS, LOGS CALL |
| 10 | ANY | ANY | ANY | ANY | DENY | EMAIL, LOG | ANY | ANY | ALL | CATCH, DENY, ALERT, AND LOG ALL OTHER CALLS |

FIG. 7B

| RRP RULE | CURRENT GROUP | CALL TYPE | ATTEMPT | RESULT | ACTION | TRACK | ADJUST POLICY? | MOVE TO | INSTALL ON | COMMENT |
|---|---|---|---|---|---|---|---|---|---|---|
| 1 | FAX-ONLY | FAX | SECURE MODE | SUCCESS | ALLOW | LOG | NO | N/A | ALL | SUCCESSFULLY SECURED INBOUND FAX CALL, CALL ALLOWED |
|   |   |   |   | FAILED | DENY | TONE, EMAIL, LOG | NO | N/A |   | FAILED TO SECURE INBOUND FAX CALL, CALL DENIED |
| 2 | DAILY RECEIV-ABLE | MODEM | SECURE MODE | SUCCESS | ALLOW | LOG | NO | N/A | ALL | SUCCESSFULLY SECURED INBOUND MODEM CALL, CALL ALLOWED |
|   |   |   |   | FAILED | DENY | TONE, EMAIL, PAGE, LOG | YES | VPSTN NON-SECURE |   | FAILED TO SECURE INBOUND MODEM CALL, CALL DENIED, EXTENSION MOVED AND SECURITY POLICY ADJUSTED |
| 3 | XXX * | VOICE, VTC | SECURE MODE | SUCCESS | ALLOW | TONE, LOG | NO | N/A | ALL | SUCCESSFULLY SECURED VOICE/VTC CALL, CALL ALLOWED |
|   |   |   |   | FAILED | DENY | MESSAGE, EMAIL, LOG |   |   |   | FAILED TO SECURE VOICE/VTC CALL, CALL DENIED |

FIG. 8A

| | | | | | | | |
|---|---|---|---|---|---|---|---|
| 4 | XXX * | FAX, MODEM | SECURE MODE | SUCCESS | ALLOW | LOG | NO | N/A | ALL | SUCCESSFULLY SECURED FAX/MODEM CALL, CALL ALLOWED |
| | | | | FAILED | DENY | TONE, EMAIL, LOG | NO | N/A | ALL | FAILED TO SECURE FAX/MODEM CALL, CALL DENIED |
| 5 | INTER-BRANCH | VOICE, VTC | SECURE MODE | SUCCESS | ALLOW | LOG | NO | N/A | ALL | SUCCESSFULLY SECURED VOICE/VTC CALL, CALL ALLOWED |
| | | | | FAILED | DENY | MESSAGE, EMAIL, LOG | NO | N/A | ALL | FAILED TO SECURE VOICE/VTC CALL, CALL DENIED |
| 6 | INTER-BRANCH | FAX, MODEM | SECURE MODE | SUCCESS | ALLOW | LOG | NO | N/A | ALL | SUCCESSFULLY SECURED FAX/MODEM CALL, CALL ALLOWED |
| | | | | FAILED | DENY | TONE, EMAIL, LOG | NO | N/A | ALL | FAILED TO SECURE FAX/MODEM CALL, CALL DENIED |
| 7 | EXEC STAFF, ENGI-NEERING | VOICE, VTC | SECURE MODE | SUCCESS | ALLOW | LOG | NO | N/A | ALL | SUCCESSFULLY SECURED VOICE/VTC CALL, CALL ALLOWED |
| | | | | FAILED | | MESSAGE, EMAIL, LOG | | | | FAILED TO SECURE VOICE/VTC CALL, CALL ALLOWED WITH MESSAGE |

FIG. 8B

| | EXEC STAFF, ENGI- NEERING | FAX, MODEM | SECURE MODE | | | | | |
|---|---|---|---|---|---|---|---|---|---|
| 8 | ANY | ANY | ANY | SUCCESS | | ALLOW | LOG | NO | N/A | SUCCESSFULLY SECURED FAX/MODEM CALL, CALL ALLOWED |
| | | | | FAILED | | | TONE, LOG | | | FAILED TO SECURE FAX/MODEM CALL, CALL ALLOWED WITH TONE |
| 9 | ANY | ANY | ANY | SUCCESS | | DENY | EMAIL, LOG | NO | N/A | ALL OTHER CALLS DENIED AND LOGGED |
| | | | | FAILED | | | | | | |

FIG. 8C

| SRB RULE | DIRECTION | SOURCE | DESTINATION | CALL TYPE | ACTION | TRACK | DATE | TIME | INSTALL ON | COMMENT |
|---|---|---|---|---|---|---|---|---|---|---|
| 1 | ANY | ANY | ANY | ANY | ALLOW | SECURE MODE, LOG | ANY | ANY | ALL | ALLOWS AND SECURES CALL, WHEN POSSIBLE |

FIG. 8D

| RRP RULE | CURRENT GROUP | CALL TYPE | ATTEMPT | RESULT | ACTION | TRACK | ADJUST POLICY? | MOVE TO | INSTALL ON | COMMENT |
|---|---|---|---|---|---|---|---|---|---|---|
| 1 | ANY | ANY | SECURE MODE | SUCCESS | ALLOW | LOG | NO | N/A | ALL | SUCCESSFULLY SECURED CALL, CALL ALLOWED |
| | | | | FAILED | ALLOW | TONE, LOG | NO | N/A | | FAILED TO SECURE CALL, CALL ALLOWED |

FIG. 8E

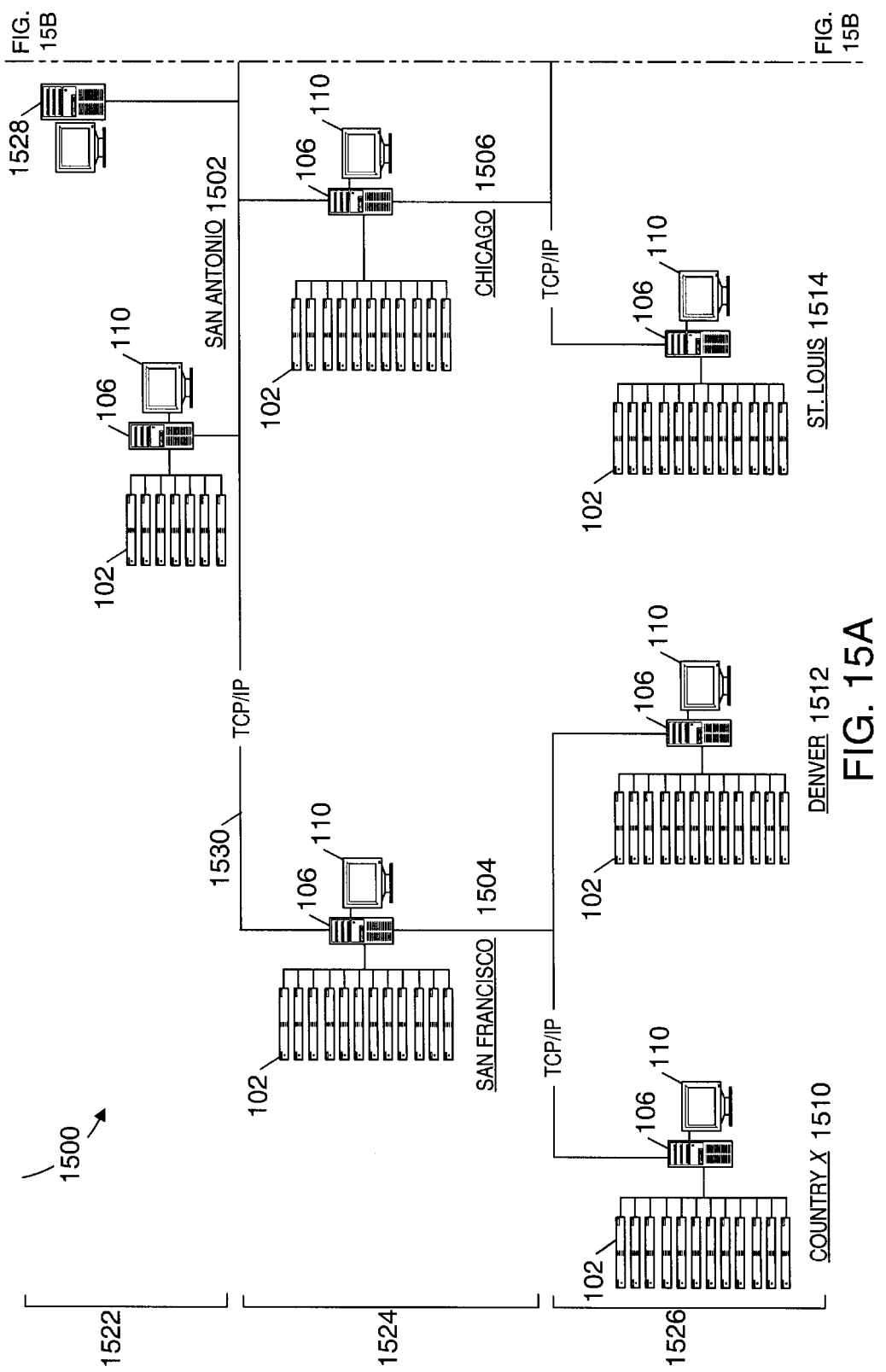

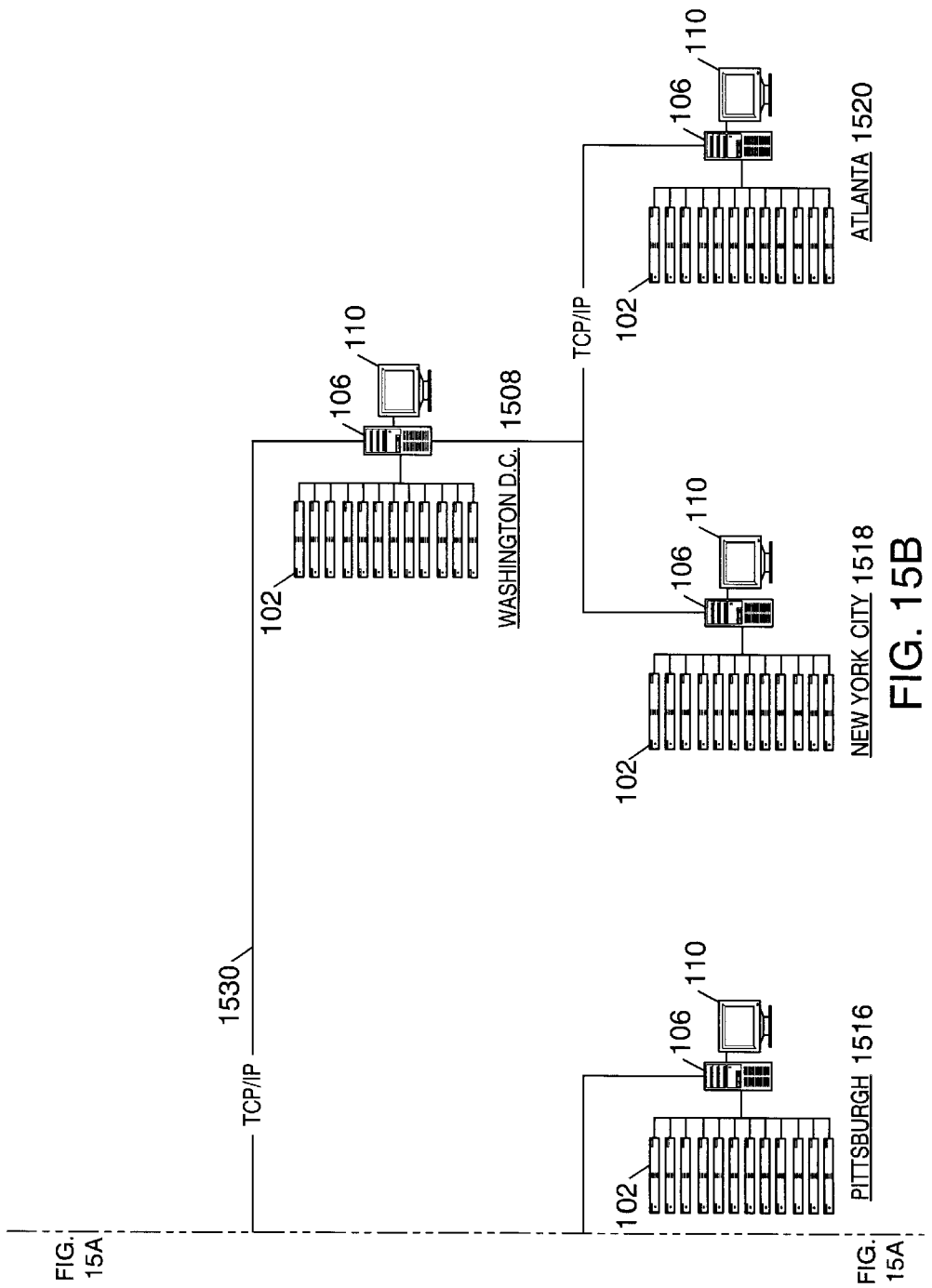

| SRB RULE | CLASS | DIRECTION | SOURCE | DESTINATION | CALL TYPE | ACTION | TRACK | DATE | TIME | INSTALL ON | COMMENT |
|---|---|---|---|---|---|---|---|---|---|---|---|
| 1 | R | OUTBOUND | VPSTN NON-SECURE | ANY | ANY | DENY | ROUTE, EMAIL(F), PAGE(F), LOG | ANY | ANY | ALL | DENYS OUTBOUND CALL FROM EXTENSION OR LINE FOUND TO BE NON-SECURE, ROUTES LOG UPWARD |
| 2 | R | INBOUND | ANY | VPSTN NON-SECURE | ANY | DENY | ROUTE, EMAIL(F), PAGE(F), LOG | ANY | ANY | ALL | DENYS INBOUND CALL TO EXTENSION OR LINE FOUND TO BE NON-SECURE, ROUTES LOG UPWARD |
| 3 | L | INBOUND | ANY | FAX-ONLY | FAX | ALLOW | SECURE MODE, LOG | ANY | 9PM-6AM | SAN ANTONIO | ALLOWS AND SECURES INBOUND CALL TO FAX-ONLY GROUP BETWEEN 9PM AND 6AM, LOGS CALL, NO ROUTING UPWARD |

| | | | | | | | | |
|---|---|---|---|---|---|---|---|---|
| 4 | L | INBOUND | ANY | DAILY RECEIVABLE | MODEM | ALLOW | SECURE MODE, LOG | ANY ANY | SAN ANTONIO | ALLOWS AND SECURES INBOUND MODEM CALL TO DAILY RECEIVABLE GROUP, LOGS CALL, NO ROUTING UPWARD |
| 5 | R | OUTBOUND | ANY | XXX * | VOICE, FAX, MODEM, VTC | ALLOW | SECURE MODE, LOG | ANY ANY | ALL | ALLOWS AND SECURES CALL TO COUNTRY X, LOGS CALL, NO ROUTING UPWARD |
| 6 | R | INBOUND | XXX * | ANY | VOICE, FAX, MODEM, VTC | ALLOW | SECURE MODE, LOG | ANY ANY | ALL | ALLOWS AND SECURES CALL FROM COUNTRY X, LOGS CALL, NO ROUTING UPWARD |
| 7 | R | ANY | INTER-BRANCH | INTER-BRANCH | VOICE, FAX, MODEM, VTC | ALLOW | SECURE MODE, LOG | ANY ANY | ALL | ALLOWS AND SECURES INTERBRANCH CALL, LOGS CALL, NO ROUTING UPWARD |

FIG. 15D

| | | | | | | | | |
|---|---|---|---|---|---|---|---|---|
| 8 | O | OUTBOUND | EXEC STAFF, ENGINEERING | ANY | VOICE, FAX, MODEM, VTC | ALLOW | SECURE MODE, LOG | ANY | ANY | ALL | ALLOWS AND SECURES CALL FROM EXEC STAFF AND ENG. GROUPS, LOGS CALL, NO ROUTING UPWARD |
| 9 | O | INBOUND | ANY | EXEC STAFF, ENGINEERING | VOICE, FAX, MODEM, VTC | ALLOW | SECURE MODE, LOG | ANY | ANY | ALL | ALLOWS AND SECURES CALL TO EXEC STAFF AND ENG. GROUPS, LOGS CALL, NO ROUTING UPWARD |
| 10 | R | ANY | ANY | ANY | ANY | DENY | ROUTE, EMAIL(F), LOG | ANY | ANY | ALL | CATCH, DENY, ALERT, AND LOG ALL OTHER CALLS, ROUTES LOG UPWARD |

FIG. 15E

ENCAPSULATION, COMPRESSION AND ENCRYPTION OF PCM DATA

CROSS-REFERENCE TO RELATED APPLICATIONS

This application claims the benefit under Title 35 United States Code 119(e) of U.S. Provisional Application No. 60/307,209, filed Jul. 23, 2001 entitled "A System and Method for Encapsulation, Compression and Encryption of PCM Data" and claims benefit from U.S. patent application Ser. No. 09/907,089, filed Jul. 17, 2001, entitled "Telephony Security System", and is related to U.S. patent application Ser. No. 09/457,494, filed Dec. 8, 1999, entitled "A Tightly Integrated Cooperative Telecommunications Firewall And Scanner With Distributed Capabilities, now U.S. Pat. No. 6,226,372 B1, and claims benefit from U.S. patent application Ser. No. 09/709,592, filed Nov. 10, 2000, entitled "A System and Method for Encapsulation, Compression and Encryption of PCM Data", all assigned to the assignee of the present invention and incorporated herein by reference.

TECHNICAL FIELD

The invention relates generally to telecommunications access control systems and more particularly, to a system and method whereby a virtual private switched telecommunications network is autonomously constructed between at least two in-line devices.

BACKGROUND OF THE INVENTION

Historically, government and business entities could be reasonably confident that their sensitive information communicated by telephone, fax, or modem was confidential, and that no one would monitor or eavesdrop on their plans and strategies. This is no longer true. In the past several years, as interception and penetration technologies have multiplied, information assets have become increasingly vulnerable to interception while in transit between the intended parties.

A wide range of communications, from those concerning military, government, and law enforcement actions, to contract negotiations, legal actions, and personnel issues all require confidentiality; as do communications concerning new-product development, strategic planning, financial transactions, or any other competition-sensitive matter. These confidential matters often require exchanges via telephone, facsimile (fax), Video TeleConference (VTC), data (modem) transmission, and other electronic communication. As businesses depend on their communications systems more and more, those systems are delivering an ever-increasing volume of information, much of which is proprietary and extremely valuable to competitors.

The increasing prevalence of digital communications systems has led to the widespread use of digital encryption systems by governments and enterprises concerned with communications security. These systems have taken several forms, from data Virtual Private Networks (VPN), to secure voice/data terminals.

As used herein, the following terms carry the connotations described below:

Data VPN is understood to refer to a shared or public packet data network wherein privacy and security issues are mitigated through the use of a combination of authentication, encryption, and tunneling.

Tunneling is understood to refer to provision of a secure, temporary path over an Internet Protocol (IP)-based network by encapsulating encrypted data inside an IP packet for secure transmission across an inherently insecure IP network, such as the Internet.

Secure is understood to refer to the use of combinations of encapsulation, compression and encryption to provide telecommunications privacy and security between two devices across an untrusted network, or the result thereof.

Telephony Appliance is understood to refer to a component of the present invention; specifically an in-line device installed on a DS-1 circuit in a telephone network and including means for controlling inbound and outbound calls by determining attributes of the call and performing actions on the call, including allowing, denying, and conducting select calls in secure mode, all pursuant to the security policy and based on at least one attribute of the call.

Communications and computer systems move massive amounts of information quickly and routinely. Enterprises are communicating using voice, fax, data, and video across the untrusted Public Switched Telephone Network (PSTN). Unfortunately, whereas a data VPN uses encryption and tunneling to protect information traveling over the Internet, a data VPN is not designed to protect voice, fax, modem, and video calls over the untrusted PSTN.

Although IP-based VPN technology is automated and widely available, solutions for creating safe tunnels through the PSTN are primarily manual, requiring user participation at both ends to make a call secure. This is the case with the use of secure voice/data terminals, such as Secure Telephone Units (STU-IIIs), Secure Telephone Equipment (STE), and hand-held telephony encryption devices.

Secure voice/data terminals effectively protect sensitive voice and data calls. However, their design and typical deployment can be self-defeating. For example, to enter a secure mode on a STU-III or STE device, both call parties must retrieve a physical encryption key from a safe storage location and insert the key into their individual STU-III or STE device each time a call is placed or received. Also, STU-III and STE devices are expensive, so they are typically located at a special or central location within a department or work center, but not at each work station.

The inconvenience, frustration, and poor voice quality of using manually activated secure voice/data terminals can motivate individuals to "talk around" the sensitive material on non-secure phones. Use of secure voice/data terminals for the communication of sensitive information can be mandated by policy, but there is currently no way to properly enforce such a requirement.

Additionally, secure voice/data terminals secure only one end-user station per device. Since they are point-to-pint devices, secure voice/data terminals cannot protect the vast majority of calls occurring between users who do not have access to the equipment. And although there may be policies that specifically prohibit it, sensitive material can be inadvertently discussed on non-secure phones and thereby distributed across the untrusted PSTN.

Secure voice/data terminals cannot implement an enterprise-wide, multi-tiered policy-based enforcement of a corporate security policy, establishing a basic security structure across an enterprise, dictated from the top of the tier downward. Neither can secure voice/data terminals implement an enterprise-wide, multi-tiered policy-based enforcement of selective event logging and consolidated reporting to be relayed up the tier.

Lastly, secure voice/data terminals cannot provide call event logs detailing information about secure calls.

Therefore, a consolidated detailed or summary report of a plurality of call event logs can not be produced for use by security personnel and management in assessing the organization's security posture.

Clearly, there is a need for a system and method to provide secure access across the untrusted PSTN through telephony resources that can be initiated by a security policy defining actions to be performed based upon at least one attribute of the call, providing multi-tiered policy-based enforcement capabilities and visibility into security events.

SUMMARY OF THE INVENTION

A system and method to provide secure access across the untrusted PSTN is described, hereafter to be referred to as Virtual Private Switched Telecommunications Network (VPSTN). The VPSTN creates a virtual private network (i.e., "secures" telecommunications), across a public untrusted network between two in-line devices by encrypting calls in accordance with a security policy. The security policy defines actions to be performed based upon at least one attribute of the call. The present invention also provides multi-tiered policy-based enforcement capabilities as well as multi-tiered policy-based security event notification capabilities.

Some primary advantages of the disclosed system and method are: (1) secure transport of voice, fax, modem, and VTC calls across the PSTN; (2) automatic discovery of called and calling party's capability to support secured communications; (3) automatic discovery of a digital DS-0 channel's line impairments and capability to support secured communications; (4) automatic detection that a received DS-0 TDM serial stream is VPSTN-compatible; (5) provision of secured communications operating at 64 Kbps, with automatic disabling of secured communications responsive to detection of a call's request for the full 64 Kbps; (6) automatic compression and decompression of the payload portion of the call when providing secured communications on circuits operating at 56 Kbps or slower; (7) operator-transparency, i.e., neither call party is required to take any specific actions in order to initiate or conduct secure communications; (8) provision of secured communication for multiple end-user stations per device (i.e., secured communication is provided for all calls routed on trunks on which the device is deployed); (9) implementation and enforcement of a security policy designating all inbound and outbound calls are automatically conducted in secure mode whenever possible; (10) implementation and enforcement of a security policy designating that select calls are conducted in secure mode based on one or more designated attributes of the call; (11) implementation and enforcement of a security policy designating that select calls are allowed or denied and other designated actions are performed responsive to the success or failure to conduct a call in secure mode; (12) creation of a VoIP-compatible packet from the data contained in the TDM serial stream; (13) encapsulation of a VoIP-compatible packet to support transport over the synchronous time division multiplexed PSTN network; (14) seamless interchange of VoIP-compatible packets over packet networks to support applications such as secure VoIP; (15) automatic synchronization of packets from one or more diverse remote VPSTN-compatible systems; (16) implementation and enforcement of a security policy designating that select calls are allowed or denied and other designated actions are performed based on one or more designated attributes of the call; (17) implementation and enforcement of a basic security structure and policy across an enterprise, dictated from the top of the tier downward; and (18) implementation and enforcement of an enterprise-wide policy of selective event logging and consolidated reporting to be relayed up the tier.

Some secondary advantages of the disclosed system and method are: (1) policy-based selection of static secret session keys, key exchange mechanisms, and encryption algorithms based on one or more designated attributes of the call; (2) secured communications transparent to the transcoding within the PSTN; (3) automatic compensation when transcoding occurs within the PSTN during secure transport; (4) audible feedback to the calling or called parties indicating the secure state of the call; (5) a message channel transported separate from and concurrent with the secured payload portion of the call; (6) the message channel stays active throughout the duration of the call; (7) secure communications can be initiated or discontinued while the call is in progress; (8) automatic generation and exchange of new keys for each session; (9) automatic disabling of secured communications responsive to detection of designated call-type; and (10) secured transport adds minimal latency to the call with voice quality comparable to toll quality, i.e., the quality of an uncompressed pulse code modulated digital signal level-0 channel at 64,000 bps.

Therefore, in accordance with the previous summary, objects, features, and advantages of the present invention will become apparent to one skilled in the art from the subsequent description and the appended claims taken in conjunction with the accompanying drawings.

BRIEF DESCRIPTION OF THE DRAWINGS

A better understanding of the system and method for autonomously constructing a virtual private switched telecommunications network between at least two in-line devices may be had by reference to the drawing figures wherein:

FIGS. 6A and 6B are a table illustrating a portion of an example user group listing for use by the virtual private switched telecommunications network of FIG. 1;

FIGS. 7A and 7B are a table illustrating a portion of an example security rule base for use by the virtual private switched telecommunications network of FIG. 1;

FIGS. 8A, 8B, and 8C are a table illustrating a portion of an example result response policy for use by the virtual private switched telecommunications network of FIG. 1;

FIG. 8D is a table illustrating a "Secure All Possible Calls" alternate security rule base for use by the virtual private switched telecommunications network of FIG. 1;

FIG. 8E is a table illustrating a "Secure All Possible Calls" alternate result response policy for use by the virtual private switched telecommunications network of FIG. 1;

FIGS. 15A and 15B are a schematic block diagram illustrating deployment of the virtual private switched telecommunications network of FIG. 1 for multi-tiered policy-based enforcement of a security policy across a large, globally distributed enterprise;

FIGS. 15C, 15D, and 15E are a table illustrating a portion of an example security rule base for use in implementing multi-tiered policy-based enforcement of the security policy;

DETAILED DESCRIPTION OF THE PREFERRED EMBODIMENTS

The present invention can be described with several examples given below. It is understood, however, that the examples below are not necessarily limitations to the present invention, but are used to describe typical embodiments of operation.

Virtual Private Switched Telecommunications Network

Figure 1:
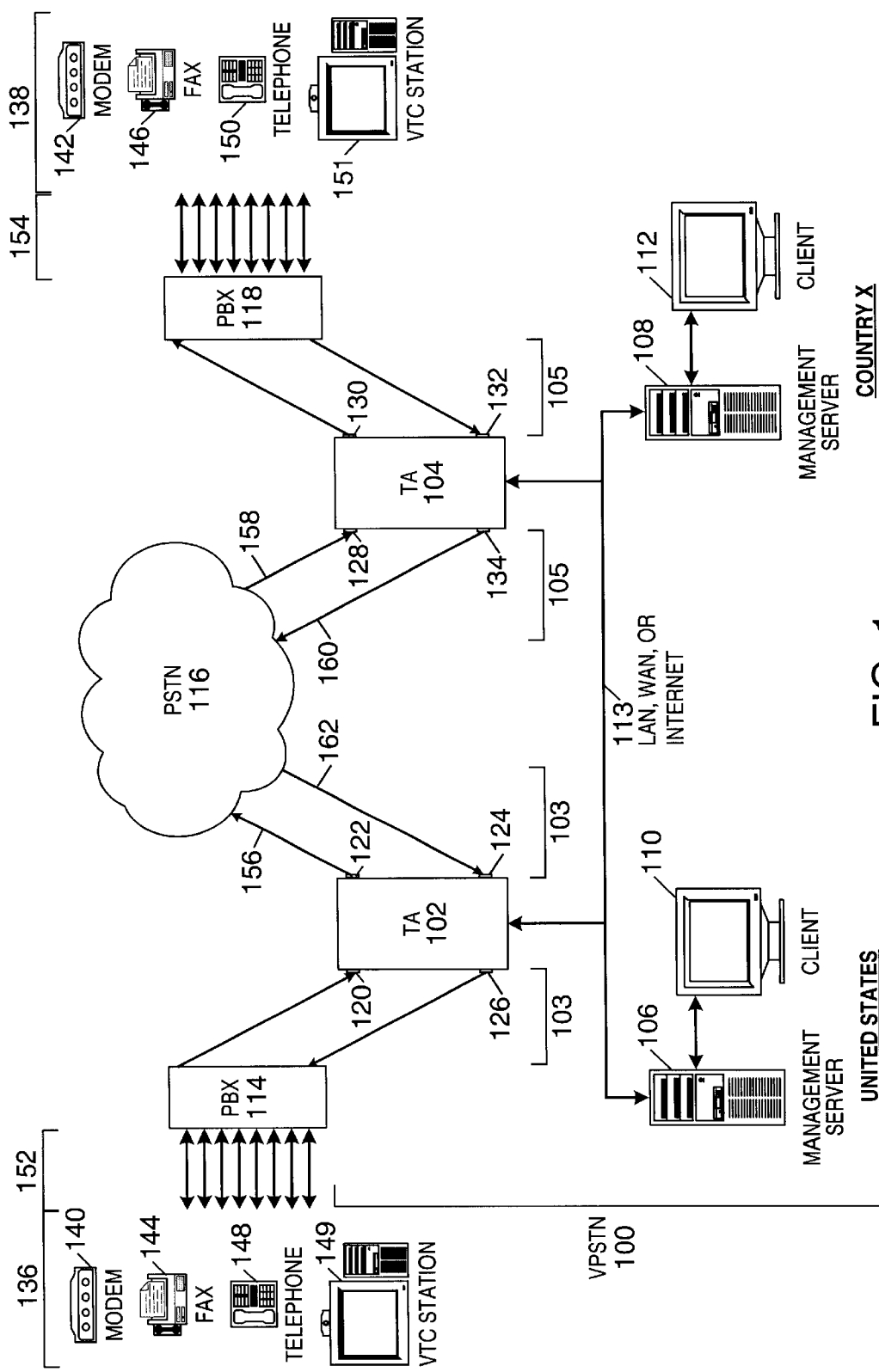
FIG. 1 is a schematic block diagram illustrating an exemplary virtual private switched telecommunications network of the present invention.

FIG. 1 is a schematic block diagram of an exemplary Virtual Private Switched Telecommunications Network (VPSTN) 100 of the present invention, similar to the telecommunications firewall implemented as shown and described in U.S. patent application Ser. No. 09/210,347, now U.S. Pat. No. 6,249,575 B1. The VPSTN 100 can be combined with the telecommunications firewall to act as an integrated VPSTN 100 and a firewall simultaneously, or to result in a mixture of capabilities of each device.

The VPSTN 100 includes at least two in-line devices such as Telephony Appliances (TA) 102 and 104, management servers 106 and 108, and clients 110 and 112, all interconnected by a Transmission Control Protocol/Internet Protocol (TCP/IP)-based Local Area Network (LAN), Wide Area Network (WAN), or the Internet (any of which are identified herein with numeral 113), for interaction as described below. The inventive functions described herein as being performed by the TA 102, management server 106, and client 110 are similarly performed by the TA 104, management server 108, and client 112, as well as subsequent embodiments of telephony appliances, management servers and clients discussed herein.

The VPSTN 100 provides secure communication between two geographically separate, even globally distributed, locations. The TA 102 and 104 are installed in-line on a DS-1 circuit. The capacity (i.e., quantity and speed of channels) on a DS-1 circuit varies relative to global location. For instance, a Trunk level 1 (T1) or J1 line (or trunk), used in North America and Japan respectively, operates at 1,544,000 bits per second (bps) and carries 24 time-division-multiplexed (TDM) Digital Signal level 0 (DS-0) channels. Additionally, in North America, an Integrated Services Digital Network Primary Rate Interface (ISDN PRI) trunk may carry either 23 TDM DS-0 channels and one signaling channel, or 24 TDM DS-0 channels. In Europe, an E1 trunk operates at 2,048,000 bps and carries 30 TDM DS-0 channels in addition to 2 signaling channels. A DS-0 channel operates at 64,000 bps, which is the worldwide standard speed for digitizing one voice conversation using Pulse Code Modulation (PCM) and sampling the voice 8,000 times per second and encoding the result in an 8-bit code (8×8000=64,000 bps). An additional variation relative to global location is the difference in the form of PCM encoding. Typically, mu-law is the standard used in North American and Japanese telephone networks, and A-law is used in European and most other national public switched telephone networks. Transcoding, or modifying the data stream from mu-law to A-law so that it can be carried via a different network, may cause the PCM value to change. Regardless of whether the T1, J1, ISDN PRI, E1, etc., trunk carrying the DS-1 circuit between the VPSTN 100 and the PSTN is the same on both sides of the PSTN (i.e., T1 trunk to PSTN to T1 trunk, as may occur with calls conducted within North America), or is some combination of trunk types (i.e., T1 trunk to PSTN to E1 trunk, as would occur with an international call between North America and Europe), all operations are transparent to the individuals placing and receiving the call (i.e., neither call party is required to take any specific actions in order to initiate or conduct a secure call).

Figure 2:
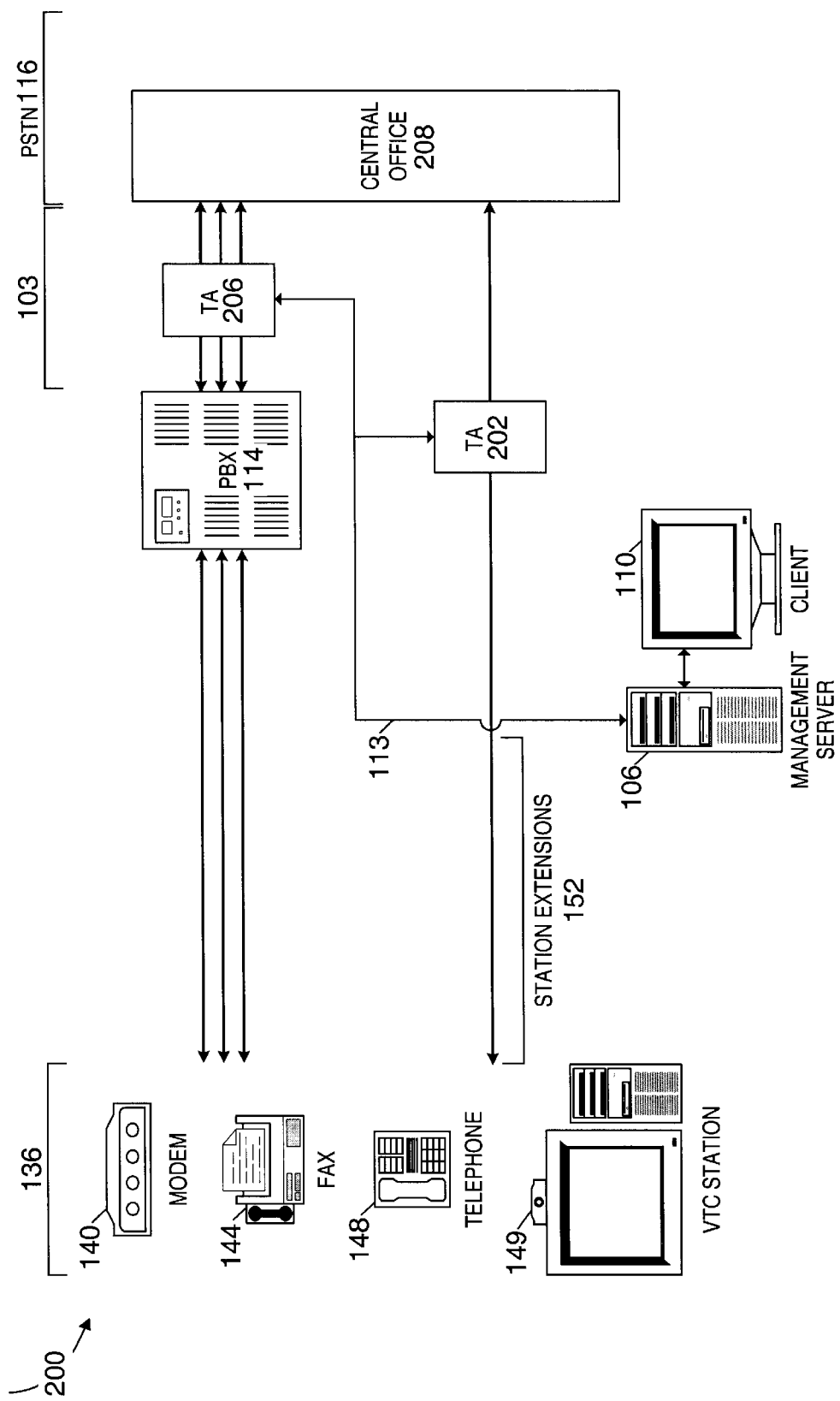
FIG. 2 is a schematic block diagram illustrating a portion of the exemplary virtual private switched telecommunications network of FIG. 1.

The TA 102 is installed in-series on a DS-1 circuit 103, within the enterprise (as shown in FIG. 2), in locations such as between a Public Branch eXchange (PBX) 114 and a Public Switched Telephone Network (PSTN) 116. The TA 104 is installed in-series on the DS-1 circuit 105, in locations such as between the PSTN 116 and a PBX 118. The TA 102 has two input and two output ports; specifically, a PBX-in port 120, a PSTN-out port 122, a PSTN-in port 124, and a PBX-out port 126. Similarly, the TA 104 has two input and two output ports; specifically, a PSTN-in port 128, a PBX-out port 130, a PBX-in port 132, and a PSTN-out port 134.

FIG. 1 shows the full-duplex nature of the VPSTN 100 with the transmit channel and the receive channel fully encrypted and decrypted, respectively. The TA 102 and 104 each control operational aspects of the transmit channels they produce. Specifically, the TA 102 controls the transmit channel that makes up links from the PSTN-out port 122 to the PSTN 116 and from the PSTN 116 to the PSTN-in port 128, represented by numerals 156 and 158 respectively. The TA 104 controls the transmit channel that makes up links from the PSTN-out port 134 to the PSTN 116 and from the PSTN 116 to the PSTN-in port 124, represented by numerals 160 and 162 respectively. Therefore, the TA 102 controls the TA 104 receive channel (the links 156 and 158) and the TA 104 controls the TA 102 receive channel (links 160 and 162).

The client 110 and 112 is a point of user-interface for the system administrator configuring a security policy, displaying and viewing real-time alerts, viewing real-time event logs, printing event logs and consolidated reports, and other operational features of the VPSTN 100.

As discussed in more detail with reference to FIGS. 3, 4, 7A–7B, and 8A–8C, a security policy is a sequential listing of rules that define whether certain calls to or from an end-user station 136 or 138 will be allowed, denied (hung-up), conducted in secure mode, reported, logged, etc. The security policy also defines whether other additional actions such as sending a tone or message to call parties to, for example, indicate the ability or inability to conduct the call in secure mode, and sending notifications such as electronic mail notification, pager alerting, console messaging, or a Simple Network Management Protocol (SNMP) trap notification are required.

The management server 106 and 108 receive the security policy from the client 110 and 112, and push a copy of the security policy to the TA 102 and 104 respectively. The management server 106 and 108 are connected to the TA 102 and 104 respectively, for consolidation and management of reports and call logs. Historical logging and archiving of calls, pursuant to a predetermined security policy, may be accomplished on the local management server, or stored via a network-accessible log server (not shown).

The TA 102 and 104 receive the security policy, and as appropriate, monitor inbound and outbound calls, allow, deny, or otherwise manipulate calls, including conducting calls in secure mode, all pursuant to the security policy, and based on at least one call attribute e.g., call type (voice, fax, modem, VTC, etc.).

The TA 102 and 104 may combine call-progress monitoring, caller-id (CND) and/or Automatic Number Identification (ANI) decoding, digital line protocol reception, decoding, demodulation, pulse dial detection, Dual-Tone MultiFrequency (DTMF) and MultiFrequency (MF) tone detection, compression, encryption, decryption, and decompression with microprocessor control, access-control logic, and call-interrupt circuitry for implementing the desired VPSTN functions. The inventive functions performed by the TA 102 and 104, as further described below, may be implemented with commercially available components, as will be understood by those skilled in the art. While also not shown, it is understood that the TA 102 and 104 are controlled by computer programming instructions stored in memory within the TA 102 and 104, and which may also be stored in memory within other components of the VPSTN 100 connected to the TA 102 and 104.

Also in FIG. 1, numerals 136 and 138 designate end-user stations, representing as examples, one or more modems 140 and 142, fax machines 144 and 146, telephones 148 and 150, and VTC stations 149 and 151, which may send or receive calls over the VPSTN 100. The modems 140 and 142 may support a desktop or portable personal computer, for example. Individual station extensions 152 and 154 connect the end-user stations 136 and 138 to the PBX 114 and 118 respectively, or to a Central Office (CO) 208 within the PSTN 116 (as shown in FIG. 2).

For clarity and simplicity of explanation, FIG. 1 and subsequent figures (except when described otherwise), show a complete DS-1 circuit connected between the TA 102, the PSTN 116, and the TA 104; although typically, the DS-0 channels that make up the DS-1 circuit may be individually switched by the PSTN 116 to different locations, relevant to call destination. It is understood that a security policy can be configured such that the VPSTN 100 is selectively applied to calls, based on at least one call attribute such as the call direction (inbound, outbound); the call source number; the call destination number; call type; the date; the time; the call duration (not shown), etc., as shown in FIGS. 7A–7B. Additionally, in the examples provided, voice is the media transported, although the present invention also provides secure transport for media in addition to voice, including fax, modem and VTC. The examples are also based on use of the Triple Data Encryption Standard (3DES) encryption algorithm, although other encryption algorithms, including DES, Advanced Encryption Standard (AES), and International Data Encryptions Algorithm (IDEA) may be used.

Additionally, the system and method supports distributed deployment, as well as a system and method of multi-tiered policy-based enforcement of a security policy, as described later with reference to FIG. 14 and FIGS. 15A–15G.

FIG. 2 is a schematic block diagram of a portion 200 of the exemplary VPSTN 100 of FIG. 1. Numerals 202 and 206 represent configurations whereby connectivity of the TA 102 may be accomplished; including any combination of one or more of either: the TA 202 (on direct lines from the CO 208); and the TA 206 (on the trunk-side of the PBX 114). The TA 202 and the TA 206, the management server 106, and client 110, are connected by the LAN, the WAN, or the Internet 113.

As represented by the TA 202 and its corresponding lines, it is understood that the TA 202 is configured to map one or more circuits through the TA 202 to their direct connection to the CO 208. For clarity and simplicity of explanation, subsequent references to TA 102 shall refer to either of the TA 202 and 206, except when specifically described otherwise.

Figure 3:
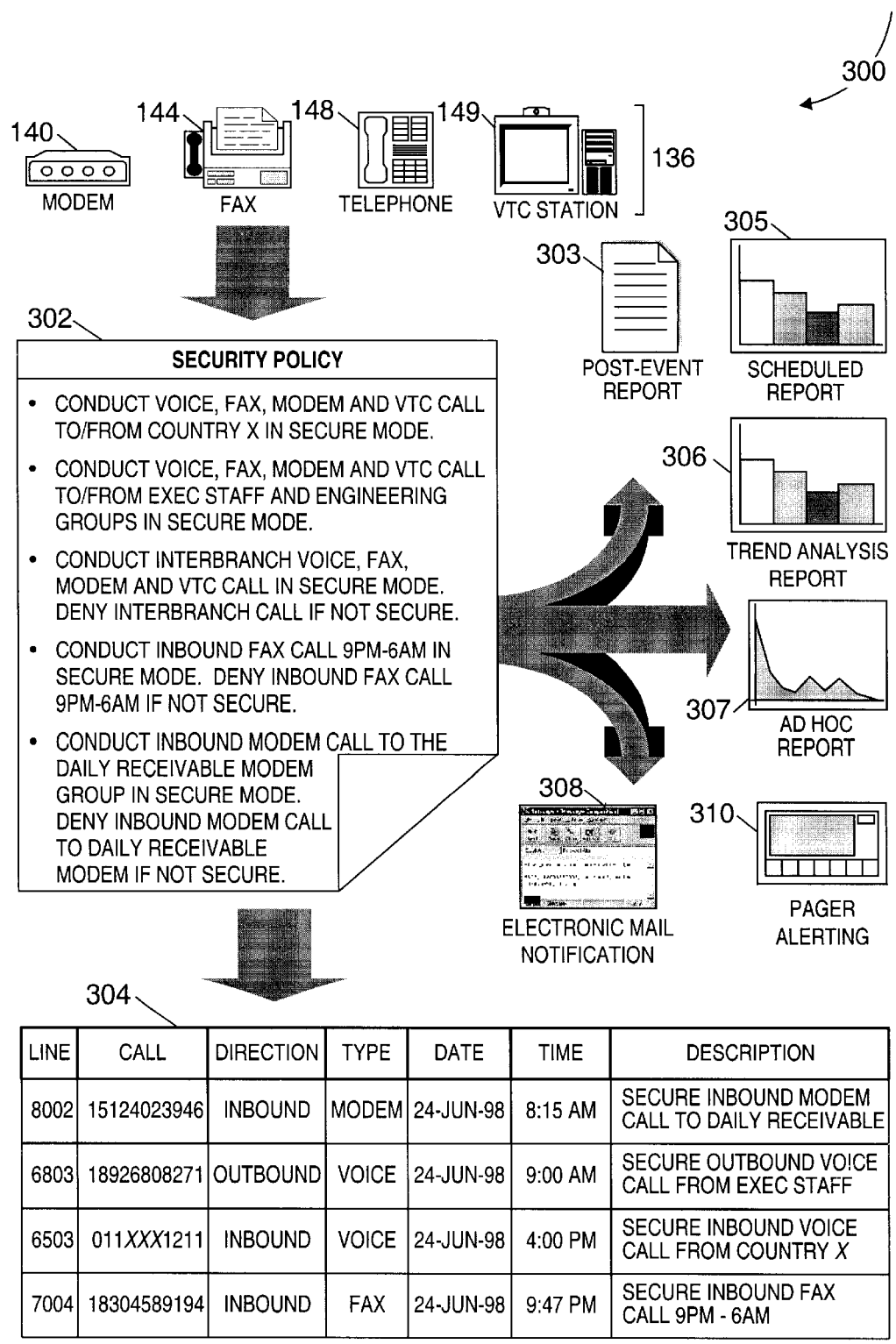
FIG. 3 is a functional schematic block diagram illustrating a simplified example security policy and corresponding actions and features of the virtual private switched telecommunications network of FIG. 1.

Referring also to FIG. 3, a functional schematic block diagram 300 illustrates certain operational aspects of the VPSTN 100 of FIG. 1. An example (very simplified) security policy 302 is shown for controlling the flow of calls through the VPSTN 100. It is understood that the rule-set is implemented by software instructions within the TA 102 that may, for example, be programmed or modified at either the TA 102 or at the management server 106 and client 110 (FIG. 1) located nearby or at a very remote distance therefrom.

As exemplified in FIG. 3, the security policy 302 dictates the type of actions associated with individual or groups of calls (e.g., allow, deny, conduct the call in secure mode, log, alert, report), pursuant to specified rules. In the present example, the security rules specify that: (1) voice, fax, modem, and VTC calls to a certain destination or from a certain source identified by a digital sequence (e.g., "XXX*," where "XXX" indicates the country code for Country X followed by any other number "*"), should be conducted in secure mode; (2) voice, fax, modem, and VTC calls to a certain inbound destination or from a certain outbound source should be conducted in secure mode; (3) voice, fax, modem, and VTC calls to a certain outbound destination or from a certain inbound source will be conducted in secure mode; (4) fax calls to a certain inbound destination at a certain time or within a certain time period will be conducted in secure mode; (5) modem calls to a certain inbound destination will be conducted in secure mode.

A call log 304 is constructed for each call, consisting of concatenated call event records designating attributes of the calls. The call logs 304 are stored in a database on the management server 106. Real-time ongoing and historical call log(s) 304 are viewed and printed from the management server 106. The call log 304 for each call is generated to an administrator-designated level of detail, ranging from very brief to verbose. While the call log 304 shown in FIG. 3 is a very simplified example, the detail of the call log 304 ranges from including all call attributes, all call events, and all actions performed on the call, to including only selected call attributes, call events, and actions performed on the call.

Configuration of the call log 304 details and the security policy 302 rule-sets may include one or more of the following call attributes and rule criteria:

Call Key—a unique identifying key assigned to each call by the TA 102;

Line—the identifier for the extension or direct connect line carrying the call;

Trunk—the PBX trunk group through which the call is processed;

Channel—the channel through which the call is processed;

TA 102 Name—the designated alias of the TA 102 processing the call and enforcing the rule;

TA 102 Group—the designated alias of the group (or array of TA(s) 102) to which the TA 102 processing the call belongs;

Start Date—the start date of the call;

Start Time—the start time of the call;

Direction—whether the call is inbound or outbound;

Raw Destination Digits—the digits dialed prior to call connection, including prefix digits, the base phone number and suffix digits;

Prefix—all digits dialed before the base phone number, such as outside access number or long distance access code;

Suffix—all digits dialed after the base phone number, such as DTMF-based PIN code used in authentication for remote access, or calling card numbers;

Source—number, or mask (e.g., 210-402-XXXX) where the source number is the number of the party initiating the call; i.e., the extension assigned to a station for outbound calls, or the number extracted from caller-ID (or any other means) for inbound calls;

Source Name—caller ID alias or identifier;

Destination—number, or mask where the destination number is the number of the party receiving the call; i.e., the extension assigned to a station for inbound calls, or the number dialed (DTMF decoded or by any other means) for outbound calls;

Connect Time—the time at which the call was answered (connected);

Call-Type—the type of call, based either on equipment or call progress events (e.g., voice, fax, modem, VoIP, STU-III-data, STU-III-voice, STU-III-unspecified, STE, wideband, wideband video, and busy, unanswered, undetermined);

Call Content—designated keywords detected in voice, VoIP, and data calls;

Actions—designated actions executed by the TA 102, pursuant to the security policy (i.e., allow or deny the call);

Tracks—additional actions and tracking functions executed, pursuant to the security policy (e.g., TA 102 additional actions include: conduct the call in secure mode, send a tone or message, record call content, redirect the call, authenticate remote access, monitor call content for keywords, transport the call using VoIP; management server 106 tracking functions include: adjust the security policy, log call events, and generate notification alerts and reports);

Redirect—the port and name of the peripheral device the call is redirected to;

Post-connect digits—digits dialed after the call is connected;

Log Time—the date and time a call event record is appended to the call log 304;

End Date—the date the call ended;

End Time—the time of day the call ended;

Duration—the duration of the call (in seconds).

Several reports, including a post-event report 303, a schedule-generated report 305, or an ad hoc report 307 may be initiated, or scheduled for later generation and delivery, via a graphical user interface-based report module (not shown) within the management server 106. The report module consolidates and manages designated call log 304 data for use in assessing an enterprise's telephony resource usage and/or security posture.

Reports are configuration-edited, generated, archived, displayed and printed via the management server 106. Report criteria includes: the date/time range for which call log data will be retrieved; call log 304 fields to be used; data organization (sorting, filtering, grouping, ordering); data presentation level (in detail or high level summary); and data display format (charts, graphs, or trends).

The post-event report 303 contains predefined information concerning a specified call event and is generated responsive to the call event, and pursuant to the security policy 302.

The schedule-generated report 305 contains previously designated categories of call log data and is automatically generated, displayed, printed, and delivered at previously designated, discrete or recurring times and/or days. The schedule-generated report 305 is delivered to the designated recipient(s) by electronic mail message, to the designated file directory on a network- or web-accessible server, and/or to the designated archival file directory. It is understood that any configurable report, and any number of reports may be scheduled for generation and display, printing, or delivery at any discrete time or number of recurring time(s).

The ad hoc report 307 is manually initiated by authorized personnel. Both the schedule-generated report 305 and the ad hoc report 307 may include, for example, batch analysis of call log data for a trend or difference/comparison report 306, either in great detail or high-level summary.

The management server 106 generates several types of alerts pursuant to the security policy 302, including, for example: electronic mail notification 308, pager alerting 310, console messaging, and SNMP trap notification (not shown). Alert contents are administrator-configurable, derived from call log 304 data. While not shown, it is understood that the VPSTN 100 is able to communicate within the enterprise network with various host computers for providing the reporting and alert functions.

Security Policy

Figure 4:
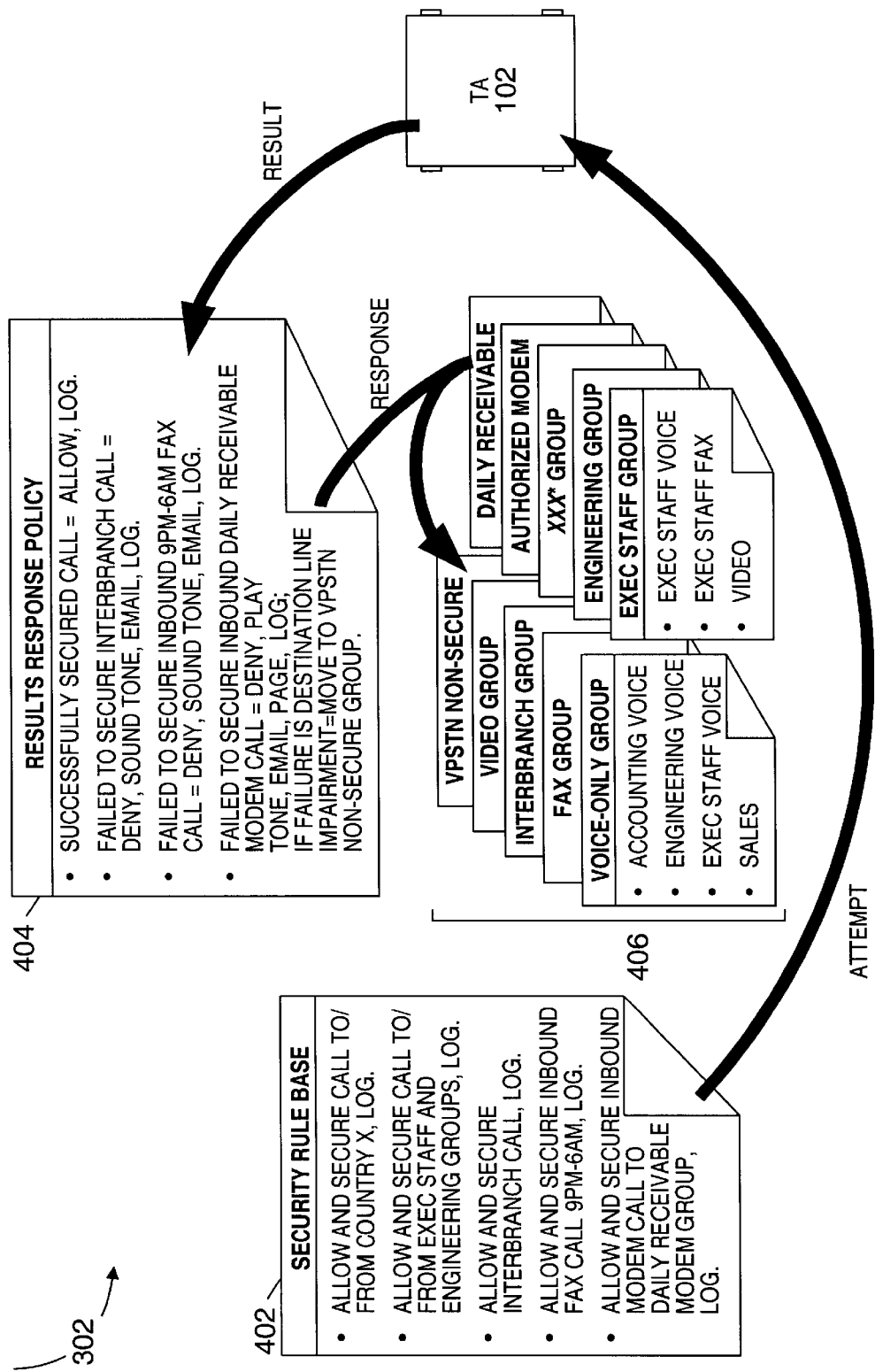
FIG. 4 is a functional schematic block diagram illustrating simplified example security policy elements and interactions of the virtual private switched telecommunications network of FIG. 1.

FIG. 4 is a functional schematic block diagram of an exemplary security policy 302 for enforcement by the VPSTN 100 of FIG. 1. In a preferred embodiment, the security policy 302 includes a security rule base 402, a result response policy 404, and a plurality of groups represented by numeral 406. Although a plurality of security rule bases, such as the security rule base 402, with a plurality of corresponding result response policies, such as the result response policy 404, can be configured for a large globally distributed enterprise, for the sake of simplicity and clarity, only one of each component is shown in this diagram.

The security rule base 402, result response policy 404, and groups 406 are used by the VPSTN 100 to control calls and respond to vulnerabilities (e.g., when the security policy 302 requires that a call be conducted in secure mode, but the attempt to conduct a secure call fails). The security rule base 402, discussed in further detail later with reference to FIGS. 7A–7B, is a sequential listing of rules that defines whether certain calls to an extension will be allowed or denied (hung-up), and logged, or if other actions such as conducting the call in secure mode will be initiated, and if electronic mail notification, pager alerting, console messaging, or SNMP trap notification are required.

The result response policy 404, discussed in further detail later with reference to FIGS. 8A–8C, is a sequential listing of response rules (similar in construction to the security rule base 402), which defines the appropriate response to the results of defined actions, such as the ability or inability to conduct a call in secure mode. The result response policy 404 defines whether the results will be logged, whether the call will be allowed or denied, whether a tone or message will be played to call parties, and whether notifications such as electronic mail notification, pager alerting, console messaging, or SNMP trap notification to designated system or security personnel, and automatic adjustments to the contents of groups 406 (and hence to the security policy 302), will be executed.

It is contemplated that the VPSTN 100 will make extensive use of groups, where objects of the same type can be collectively referred to by a meaningful alias. Groups 406, discussed in further detail later with reference to FIGS. 6A–6B, are used by both the security rule base 402 and the result response policy 404 to indicate and "bundle" specific extensions for convenience in applying the security policy 302. When dictated by the result response policy 404, the management server 106 adjusts the security policy 302 by moving an extension from its current group within group 406 to a different designated group within group 406. Although not shown, the use of various types of objects and groups of objects by both the security rule base 402 and the result response policy 404 in applying the security policy 302, such as groups of designated static secret keys, key exchange mechanisms, and encryption algorithms, are contemplated.

Whether the TA 102 attempts and succeeds, or attempts and fails to establish and conduct the call in secure mode, the TA 102 references the result response policy 404 to determine the appropriate response to the success or failure. When the result response policy 404 rule is matched, the TA 102 allows or denies the call, may play a tone or message, and notifies the management server 106 that the rule has fired, pursuant to the result response policy 404. The management server 106 references the fired result response policy 404 rule to determine the appropriate response to the success or failure of the attempt. Responses may include sending notifications such as electronic mail notification, pager alerting, console messaging, or a SNMP trap notification, logging the event, and adjusting the security policy by moving the extension from its current group to a different group.

For example, assume that a daily inbound call is placed from the Chicago branch office to one of the modems in the daily receivable modem group, for the purpose of reporting the day's receipts. Since the daily receipts are confidential information, the security rule base 402 includes the following rule: "Allow inbound modem calls to extensions in the daily receivable modem group, conduct the call in secure mode, and log the call."

The result response policy 404 includes the following rule: "Allow inbound modem calls to extensions in the daily receivable group that are successfully conducted in secure mode and log the event;" and "Deny inbound modem calls to extensions in the daily receivable group that fail to be conducted in secure mode, play a tone, generate an electronic mail notification and a pager alert, and log the event. If the attempt to conduct the call in secure mode fails, the daily receivable modem extension is moved from the daily receivable modem group to the VPSTN non-secure group."

Pursuant to the security rule base 402, and as described later with reference to FIGS. 13A and 13B, the inbound modem call to the daily receivable modem group will be conducted in secure mode. If the call can not be conducted in secure mode, pursuant to the result response policy 404, the TA 102 plays a tone and denies the call. The management server 106 generates an email and page, logs the call, and moves the extension from the daily receivable modem group to the VPSTN non-secure group, thereby denying any future modem traffic on the extension.

Installation, Configuration, and Operation

Figure 5A:
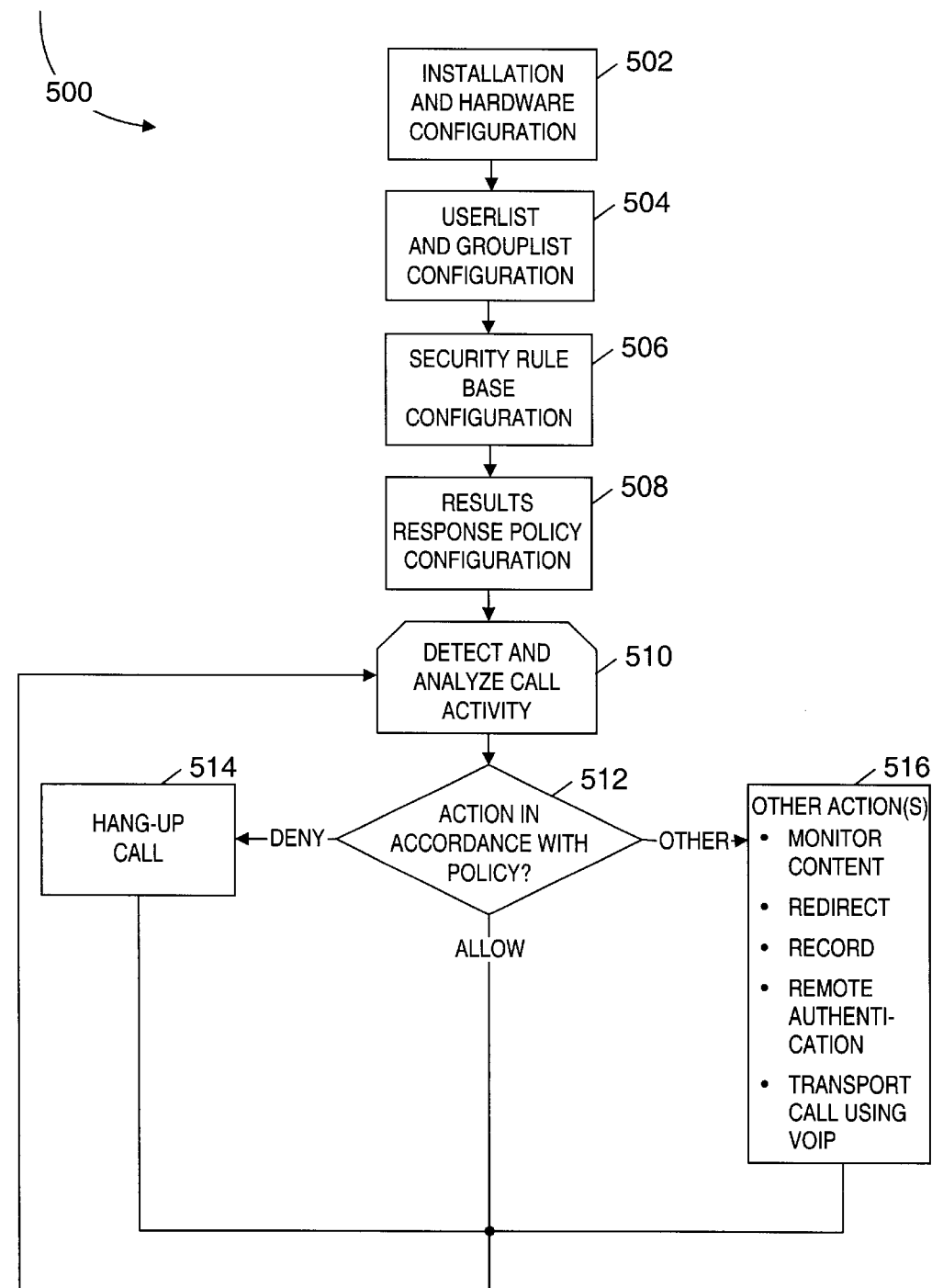
FIGS. 5A and 5B are a process flow diagram illustrating installation, configuration, and operational processes of the virtual private switched telecommunications network of FIG. 1.
Figure 5B:
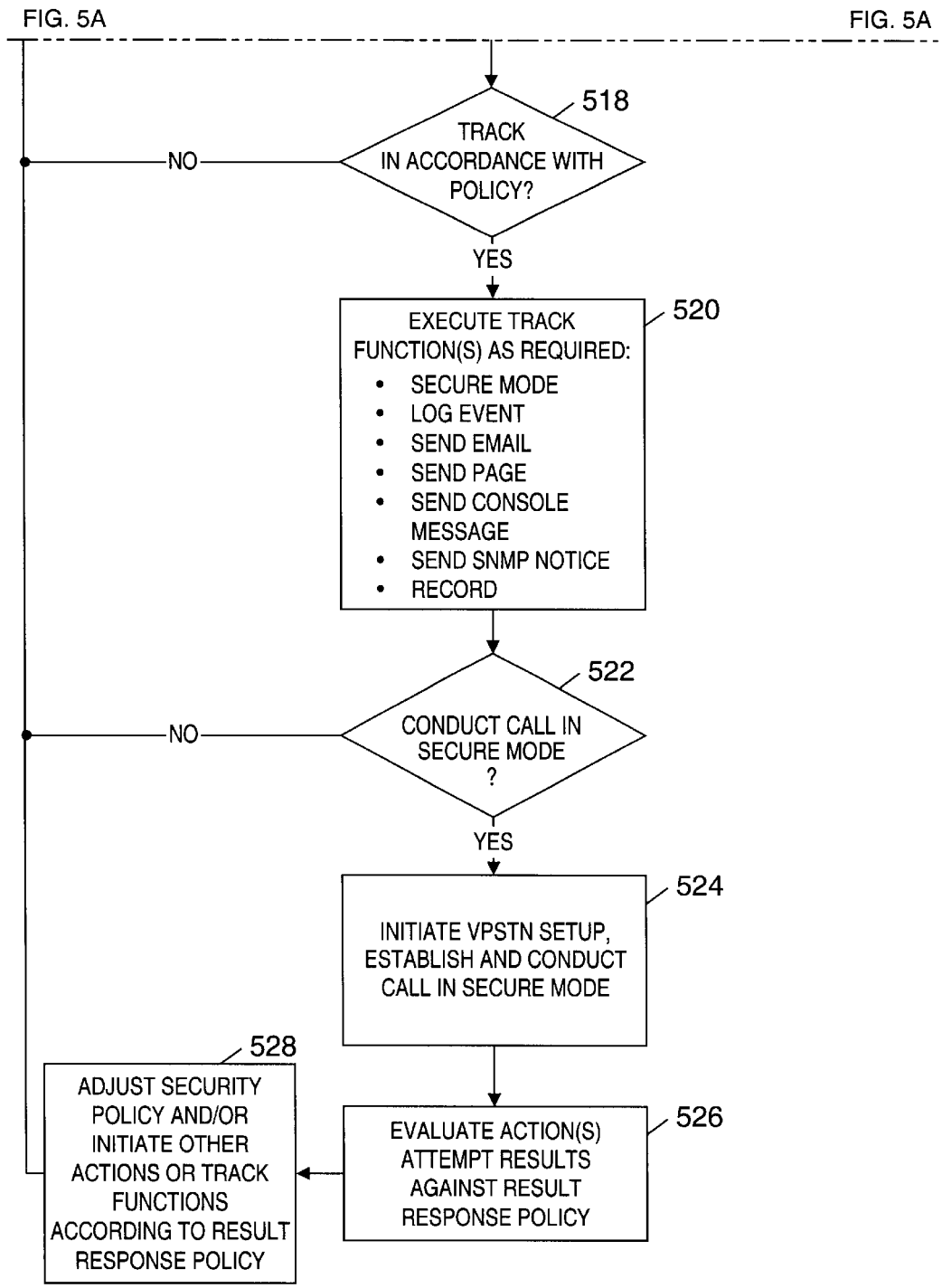

FIGS. 5A and 5B collectively illustrate a process flow diagram 500 of the installation, configuration and operation processes for the VPSTN 100 of FIG. 1. Once installed and configured, it is understood that the VPSTN 100 is capable of operating in a continuous processing loop, including detecting call attributes and analyzing call activity, while simultaneously performing appropriate actions (e.g., initiating and conducting calls in secure mode), pursuant to the rules in the defined security policy 302. There are, however, a number of processes that are first performed as part of the installation and configuration of the VPSTN 100 within an enterprise, or one or more of its locations.

Step 502 refers to the process of system installation and hardware configuration. The TA 102 are installed in-line, as shown by TA 202 and 206 in FIG. 2. The management server 106, and client 110 are set up, whereby personal computers, meeting certain performance specifications, are acquired and configured with an operating system, booted, and made ready for operation. Software required to operate the VPSTN 100, including for example defining and maintaining the security policy 302, is installed onto the management server 106. Although not shown, it is understood that installation of control software may include writing firmware instructions for the associated switches and/or the associated control logic for the TA 102, as required. The TA 202 assigns telephone numbers to direct connect lines that come directly from the CO 208. After the system is installed, and with power off, the VPSTN 100 is transparent to the enterprise telecommunications system (i.e., all wire-pairs are terminated at the same points as prior to installation of the system).

Step 504 refers to userlist and group 406 configuration, discussed previously with reference to FIG. 4 and later with reference to FIGS. 6A and 6B, whereby extensions are organized and labeled in relation to their commonality with other extensions as a means to "bundle" extensions together for convenience in managing telephony resources and applying the security policy 302. As discussed previously with reference to FIG. 4, other lists and groups may be created at this time, designating objects such as static secret keys, key exchange mechanisms, and encryption algorithms.

Step 506 refers to configuration of the security rule base 402, discussed previously with reference to FIG. 4 and later with reference to FIGS. 7A–7B. Step 508 refers to configuration of the result response policy 404, discussed previously with reference to FIG. 4 and later with reference to FIGS. 8A–8C. Steps 510–520 refer to the process of detecting call attributes and analyzing call activity, whereupon actions are performed for each call pursuant to the security policy 302, discussed below and in further detail later with reference to FIGS. 9A and 9B.

In FIG. 5A, the process of call detecting and analyzing call activity begins in step 510. For each end-user station 136 connected by an individual station extension 152, direct connect line, or DS-1 circuit through the TA 102, the TA 102 captures and analyzes call activity, then consolidates and reports details of the activity for further processing.

An aspect of this process involves the ability of the TA 102 to distinguish between voice, fax, modem, and VTC call types. Algorithms for call type distinction are utilized that, in one implementation, distinguish the call type based upon spectral analysis associated with typical fax and other data transmission protocols.

In step 512, the TA 102 determines what actions the security rule base 402 dictates to be performed for a particular call. The rule-set for the security rule base 402, previously configured in step 506 and used in step 512, is configured and programmed to meet the resource management and security needs of the enterprise, which may include allowing the call, in which case execution proceeds directly to step 518; denying the call, in which case execution proceeds to step 514. As previously mentioned, the VPSTN 100 may be combined with a telecommunications firewall, resulting in a mixture of capabilities from each device; such as content monitoring, redirecting, recording, and authorizing remote access for the call; in which case execution proceeds to step 516.

In FIG. 5B, in step 518, the TA 102 determines whether the security rule base 402 also dictates track actions to be executed in step 520. If a negative determination is made, execution proceeds to step 510, as the VPSTN 100 continues detecting call attributes and analyzing call activity until the call ends. If a positive determination is made, execution proceeds to step 520 where the management server 106 performs track functions such as logging the call event and generating electronic mail notification, pager alerting, console messaging, and SNMP trap notification. As discussed previously with reference to the call log 304 and FIG. 3, the call log 304 for each call is generated to an administrator-designated level of detail, ranging from very brief to verbose.

In step 522, the TA 102 determines whether the security rule base 402 dictates that the TA 102 conduct the call in secure mode. If a negative determination is made, execution proceeds to step 510. If a positive determination is made in step 522, the TA 102 conducts, or attempts to conduct the call in secure mode in step 524.

In step 526, the TA 102 evaluates the success or failure of the attempt in step 524 to conduct the call in secure mode against the result response policy 404 rule-set, thereby determining if additional actions or track functions are designated. For example, in response to a successful or failed attempt to setup and conduct a call in secure mode, the result response policy 404 may dictate responses such as: allowing or denying the call; sending a tone or message to indicate the call is secure or non-secure; logging the call event; sending notifications such as electronic mail notification, pager alerting, console messaging, or SNMP trap notification to designated system or security personnel; generation of a scheduled report; and automatic adjustment to the contents of groups 406 (and hence to the security policy 302); as described in step 528 and in further detail later with reference to FIGS. 8A–8C.

User List and Group Configuration

FIGS. 6A and 6B collectively illustrate a portion of the exemplary user and group listing 406, previously mentioned with reference to FIG. 4 and step 504 in FIG. 5A. The group listing 406 shown in FIGS. 6A and 6B defines each extension or direct connect line relative to its commonality with other extensions and lines, thereby "bundling" extensions together by commonality for convenience in managing telephony resources and applying the security policy 302. The security rule base 402 and result response policy 404 may refer to individual extensions, or may use group names to refer to all extensions in the group.

For example, all telephone extensions within the facility in the San Antonio offices which are intended to receive only voice calls, are listed in the "voice-only" group (i.e., extensions within the "sales," "engineering voice," "exec staff voice," and the "accounting voice" subgroups). All lines and extensions within the facility in the San Antonio offices which are intended to receive only fax calls, are listed in the "fax-only" group (i.e., several ungrouped fax extensions, and extensions within the "engineering fax" and the "exec staff fax" subgroups). All lines and extensions in the San Antonio offices with known and security configuration-approved modems are listed in the "authorized modem" group, which includes the "daily receivable modem" group, the "engineering modem" group, and several other authorized, individual modem extensions. The "inter-branch" group contains "branch offices voice-only," "branch offices fax-only," "branch offices authorized modem," and "branch offices video" subgroups from each branch office within the globally distributed organization, including the facility represented by the other groups listed within group 406. The group "XXX*" is created to apply the security policy 302 to calls to and from a certain country (e.g., Country X), whereas "XXX*" refers to the country code "XXX" for Country X, followed by any other number "*," thereby applying the security policy 302 against calls to a certain destination or from a certain source identified by a digital sequence. The VPSTN non-secure group contains certain lines and extensions on which secure calls are expected to be conducted but could not be set up or conducted and on which all future calls are denied pending further investigation by security personnel.

Security Rule Base Configuration

FIGS. 7A and 7B collectively illustrate a portion of an exemplary security rule base, such as the security rule base 402, for use in connection with the VPSTN 100, as previously mentioned with reference to FIG. 4, and step 506 in FIG. 5A. Configuring the security rule base 402 involves creating a rule-set that defines what actions and track functions will be associated with particular groups of objects.

Referring to FIGS. 7A–7B, an example security rule base 402 defines rules that, based upon call attributes including "Direction" (inbound, outbound), "Source," "Destination," "Call type" (e.g., voice, fax, modem, VTC), "Date," "Time," and "Duration" (not shown), implement an "Action" (allow or deny the call), other additional actions, and logging, reporting and notification functions, "Track". Additionally, each rule has the TA 102 deployment location/identifier "Install On," allowing an enterprise to implement one single security rule base 402 containing rules designated to be applied in specific locations.

It is understood that the security rule base 402 may include any number and types of rules, and although not all possible call attributes are used in this example, rules may be constructed using any call attributes contained in the call log 304, as shown and described with reference to FIG. 3 and any objects or groups of objects as described with reference to FIGS. 4, 6A, and 6B.

Additionally, any combination of action(s) or tracking function(s) may be included in the security rule base 402, pursuant to the enterprise's telephony security and resource management needs.

It is further understood that each rule is evaluated in sequential order, and the security rule base 402 is exited after any one rule matches the determined call attributes. Because call-type detection is continuous during the call, change in call-type during a call is detected. Consequently, each rule in the security rule base 402, except for the rule already fired by the call's previous attribute, is re-evaluated in sequential order, using the updated call-type attributes. Actions and track functions are then performed based upon the rule matched with the updated call attribute.

Referring now to FIGS. 7A–7B, the Security Rule Base (SRB) 402 Rules 1–10 are explained as follows:

Rule 1:
This rule states "Deny outbound calls from extensions in the VPSTN non-secure group, generate an electronic mail and page, and log the call." This rule is installed on all TA 102. This rule identifies and segregates lines, and denies calls over the lines that are in the VPSTN non-secure group, and logs the call for accounting purposes.

Rule 2:
This rule states "Deny inbound calls to extensions in the VPSTN non-secure group, generate an electronic mail and page, and log the call." This rule is installed on all TA 102. This rule identifies and segregates lines, and denies calls over the lines that are in the VPSTN non-secure group, and logs the call for accounting purposes.

Rule 3:
This rule states "Allow inbound fax calls to extensions in the fax group between 9 pm and 6 am, conduct the call in secure mode, and log the call." This rule is installed on all TA 102. This rule causes all inbound fax calls to extensions in the fax group during a specified time to be conducted in secure mode, and logs the call for accounting purposes.

Rule 4:
This rule states "Allow inbound modem calls to extensions in the daily receivable modem group, conduct the call in secure mode, and log the call." This rule is installed on the TA 102 in San Antonio. This rule causes all inbound modem calls to a specified inbound destination to be conducted in secure mode and logs the call for accounting purposes.

Rule 5:
This rule states "Allow all outbound international voice, fax, modem, and VTC calls to Country X, conduct the call in secure mode, and log the call." Note that the "XXX*" in the "Destination" column represents any call with the country code for Country X, "XXX" followed by any other number "*". This rule is installed on all TA 102. This rule causes all outbound voice, fax, modem, and VTC calls to any destination within Country X to be conducted in secure mode, and logs the call for accounting purposes.

Rule 6:
This rule states "Allow all inbound international voice, fax, modem, and VTC calls from Country X, conduct the call in secure mode, and log the call." This rule is installed on all TA 102. This rule causes all inbound voice, fax, modem, and VTC calls from any inbound source within Country X to be conducted in secure mode, and logs the call for accounting purposes.

Rule 7:
This rule states "Allow inbound and outbound voice, fax, modem, and VTC calls between extensions in the inter-branch groups, conduct the call in secure mode, and log the call." This rule is installed on all TA 102. This rule causes all inbound and outbound voice, fax, modem, and VTC calls to and from specified sources and destinations to be conducted in secure mode, and logs the call for accounting purposes.

Rule 8:
This rule states "Allow outbound voice, fax, modem, and VTC calls from extensions in the exec staff and engineering groups, conduct the call in secure mode, and log the call." This rule is installed on all TA 102. This rule causes all outbound voice, fax, modem, and VTC calls from specified outbound sources to be conducted in secure mode, and logs the call for accounting purposes.

Rule 9:
This rule states "Allow inbound voice, fax, modem, and VTC calls to extensions in the exec staff and engineering groups, conduct the call in secure mode, and log the call." This rule is installed on all TA 102. This rule causes all inbound voice, fax, modem, and VTC calls to specified inbound destinations to be conducted in secure mode, and logs the call for accounting purposes.

Rule 10:
This catch-all rule states "Deny all calls, generate an electronic mail and log the call." This rule is installed on all TA 102. At first glance, this rule seems to deny any call to or from anywhere. This is not the case. This rule is typically placed at the bottom of the sequential list of rules to deny, log, and send notification for all calls that do not fit into any of the preceding rules. Again, each rule is evaluated in sequential order, exiting immediately after any one rule matches all the call attributes.

Security Policy

Result Response Policy Configuration

FIGS. 8A, 8B, and 8C collectively illustrate a portion of an exemplary result response policy, such as the result response policy 404, for use in connection with the VPSTN 100, as previously mentioned with reference to FIG. 4, and step 508 in FIG. 5A. Configuring the result response policy 404 involves creating a set of response rules that define what action(s) and track functions(s) the TA 102 and the management server 106 perform responsive to attempted actions such as the success or failure of initiating and conducting a secure call.

Referring to FIGS. 8A–8C, an example result response policy 404 defines rules that, based upon the extension's "Current Group," "Call type" (e.g., fax, modem, voice, VTC), the "Attempt" that was made pursuant to the fired security rule base 402 rule, and the "Result" of the attempt, implements an "Action" (allow or deny the call), notification and event logging functions ("Track"), an option to automatically adjust the security policy 302 ("Adjust Policy"), and defines the new group the extension will be placed in ("Move To"). Additionally, each rule has a deployment location "Install On," allowing an enterprise to implement one single result response policy 404 containing rules designated to be applied in specific TA locations.

It is understood that the result response policy 404 may include any number and types of rules, and although not all possible call attributes are used in this example, rules may be constructed using any call attributes contained in the call log 304, as shown and described with reference to FIG. 3 and any objects or groups of objects as described with reference to FIGS. 4, 6A, and 6B.

Additionally, any combination of action(s) or tracking function(s) may be included in the result response policy 404, pursuant to the enterprise's telephony security and resource management needs.

It is further understood that each rule is evaluated in sequential order, and the result response policy 404 is exited after any one rule matches the determined call attributes.

Referring now to FIGS. 8A, 8B, and 8C, the Result Response Policy (RRP) 404 Rules 1–9 are explained as follows:

Rule 1:

This rule states "Allow inbound fax calls to extensions in the fax-only group that are successfully conducted in secure mode and log the event;" and "Deny inbound fax calls to extensions in the fax-only group that fail to be conducted in secure mode, play a tone, generate an electronic mail, and log the event." This rule is installed on all TA 102. This rule allows secure fax communication and denies all non-secure fax communication with extensions in the fax-only group. This result response policy rule is applicable to security rule base 402 Rule 3 of FIG. 7A.

Rule 2:

This rule states "Allow inbound modem calls to extensions in the daily receivable group that are successfully conducted in secure mode and log the event;" and "Deny inbound modem calls to extensions in the daily receivable group that fail to be conducted in secure mode, play a tone, generate an electronic mail, a page alert, log the event, and move the daily receivable modem extension from the daily receivable modem group to the VPSTN non-secure group."

This rule is installed on all TA 102. This rule allows secure inbound modem communication with extensions in the daily receivable group and denies all non-secure communication. Failure to conduct a secure call within the enterprise may be a result of packet tampering, so the line is moved to the VPSTN non-secure group, denying further use. Designated personnel are notified via electronic mail and pager for investigation and follow-up. This result response policy rule is applicable to security rule base 402 Rule 4 of FIG. 7A.

Rule 3:

This rule states "Allow voice and VTC calls to and from Country X that are successfully conducted in secure mode, play a tone, and log the event;" and "Deny voice and VTC calls to and from Country X that fail to be conducted in secure mode, play a message, generate an electronic mail, and log the event."

This rule is installed on all TA 102. This rule allows secure voice and VTC communication with Country X, and denies all non-secure communication with an audible warning if secure communication is not possible. This result response policy rule is applicable to security rule base 402 Rules 5 and 6 of FIGS. 7A and 7B.

Rule 4:

This rule states "Allow fax and modem calls to and from Country X that are successfully conducted in secure mode and log the event;" and "Deny fax and modem calls to and from Country X that fail to be conducted in secure mode, play a tone, generate an electronic mail, and log the event."

This rule is installed on all TA 102. This rule allows secure fax and modem communication with Country X, and denies all non-secure communication with a warning tone if secure communication is not possible. This result response policy rule is applicable to security rule base 402 Rules 5 and 6 of FIGS. 7A and 7B.

Rule 5:

This rule states "Allow voice and VTC calls between extensions in the inter-branch group that are successfully conducted in secure mode, and log the event;" and "Deny voice and VTC calls between extensions in the inter-branch group that fail to be conducted in secure mode, play a message, generate an electronic mail, and log the event."

This rule is installed on all TA 102. This rule allows only secure voice and VTC communication between extensions in the inter-branch group and denies all non-secure communication. This result response policy rule is applicable to security rule base 402 Rule 7 of FIG. 7B Rule 6:

This rule states "Allow fax and modem calls between extensions in the inter-branch group that are successfully conducted in secure mode and log the event;" and "Deny fax and modem calls between extensions in the inter-branch group that fail to be conducted in secure mode, play a tone, generate an electronic mail, and log the event."

This rule is installed on all TA 102. This rule allows secure fax and modem communication between extensions in the inter-branch group, and denies all non-secure communication. This result response policy rule is applicable to security rule base 402 Rule 7 of FIG. 7B.

Rule 7:

This rule states "Allow voice and VTC calls to and from extensions in the exec staff and engineering groups that are successfully conducted in secure mode and log the event;" and "Allow voice and VTC calls to and from extensions in the exec staff and engineering groups that fail to be conducted in secure mode, play a message, generate an electronic mail, and log the event."

This rule is installed on all TA 102. This rule allows secure voice and VTC communication with extensions in the exec staff and engineering groups, and allows non-secure communication with an audible warning if secure communication is not possible. This result response policy rule is applicable to security rule base 402 Rules 8 and 9 of FIG. 7B.

Rule 8:

This rule states "Allow fax and modem calls to and from extensions in the exec staff and engineering groups that are successfully conducted in secure mode and log the event;" and "Allow fax and modem calls to and from extensions in the exec staff and engineering groups that fail to be conducted in secure mode, sound a tone, and log the event."

This rule is installed on all TA 102. This rule allows secure fax and modem communication with extensions in the exec staff and engineering groups, and allows non-secure communication with a warning tone if secure communication is not possible. This result response policy rule is applicable to security rule base 402 Rules 8 and 9 of FIG. 7B.

Rule 9:

This catch-all rule states "Deny all calls, generate an electronic mail, and log the call." This rule is installed on all TA 102. At first glance, this rule seems to deny any call from anywhere. This is not the case. This rule is typically placed at the bottom of the sequential list of rules to deny, log, and send a notification for all calls that do not fit into any of the preceding rules. Again, each rule is evaluated in sequential order, exiting immediately after any one rule matches all the call attributes.

Security Policy

"Secure All Possible Calls" Configuration

FIGS. 8D and 8E collectively illustrate an alternate security policy 416 for the VPSTN 100 wherein a security rule base 412 and a result response policy 414 promote secure communication with any VPSTN-capable source or destination. As shown in FIG. 8D, the security rule base 412 consists primarily of one "Secure All Possible Calls" rule which states "Allow calls from any direction (inbound and outbound), from any source, to any destination, of any call type, on any date, at any time, conduct the call in secure mode, and log the call." This rule is installed on all TA 102. Alternatively, it is contemplated that an organization may want to promote secure communication and yet may need to refrain from using the VPSTN 100 secure communications on specific extensions or on calls with specific attributes (e.g., STU-III calls). In such a case, the current Rule I in FIG. 8D is preceded by rules configured to address these specific needs.

FIG. 8E shows the result response policy 414 for the security rule base 412 of FIG. 8D. The result response policy 414 consists primarily of one rule which states "Allow calls with any extension that is successfully conducted in secure mode and log the event;" and "Allow calls with any extension that fails to be conducted in secure mode, sound a tone, and log the event." It is understood that, if desired, Rule 1 can be configured such that calls are denied if the attempt to conduct the call in secure mode fails. Alternatively, it is contemplated that an organization may want to promote secure communication and yet may need to allow or deny a call based on the success or failure to conduct the call in secure mode and at least one other call attribute (e.g., the current group, call type, etc.). In such a case, the current Rule 1 in FIG. 8E is preceded by rules configured to address these specific needs.

Security Rule Base Enforcement

Figure 9A:
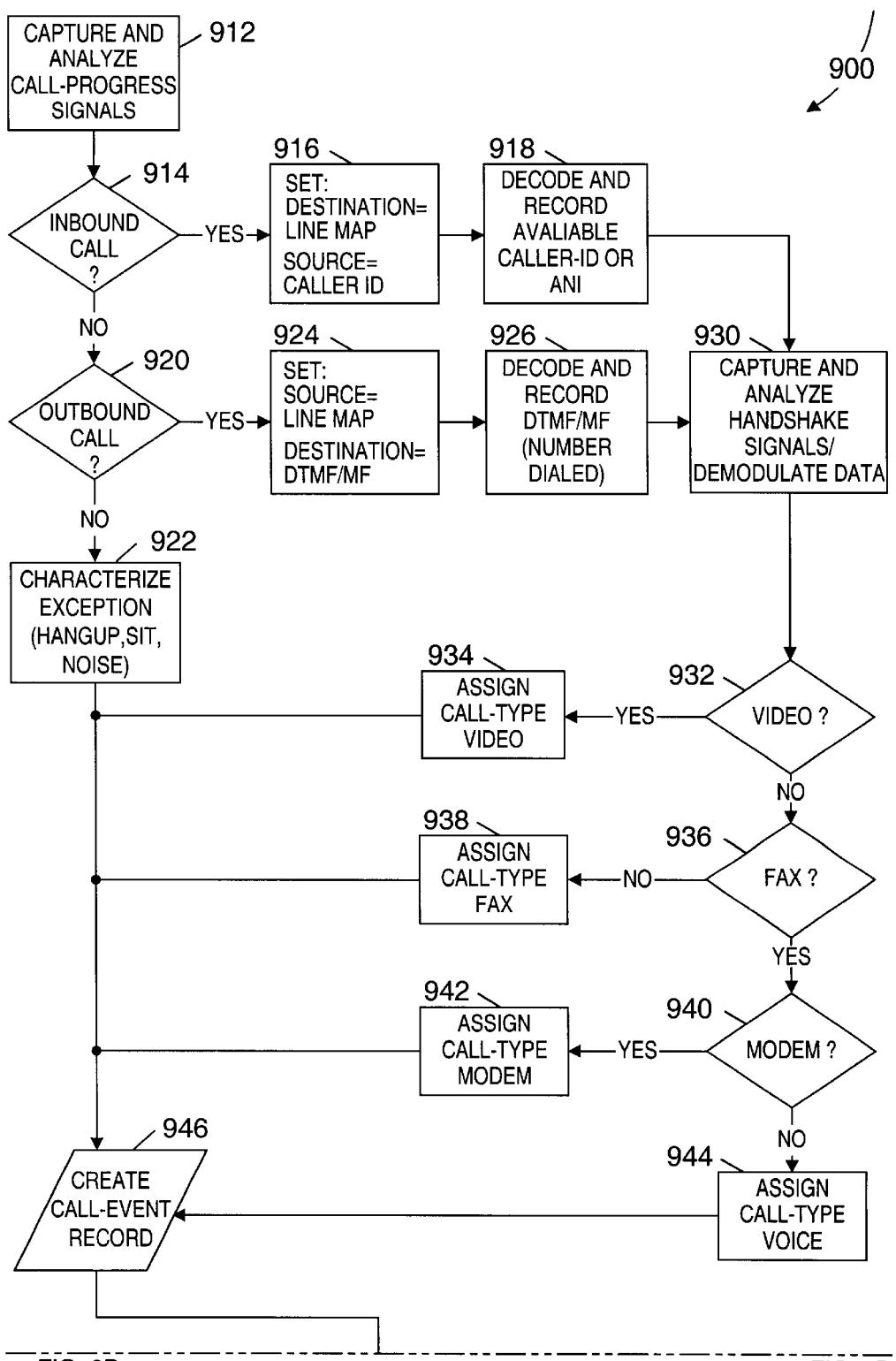
FIGS. 9A and 9B are a process flow diagram illustrating detection and analysis of call activity and implementation of the security rule base by the virtual private switched telecommunications network of FIG. 1.
Figure 9B:
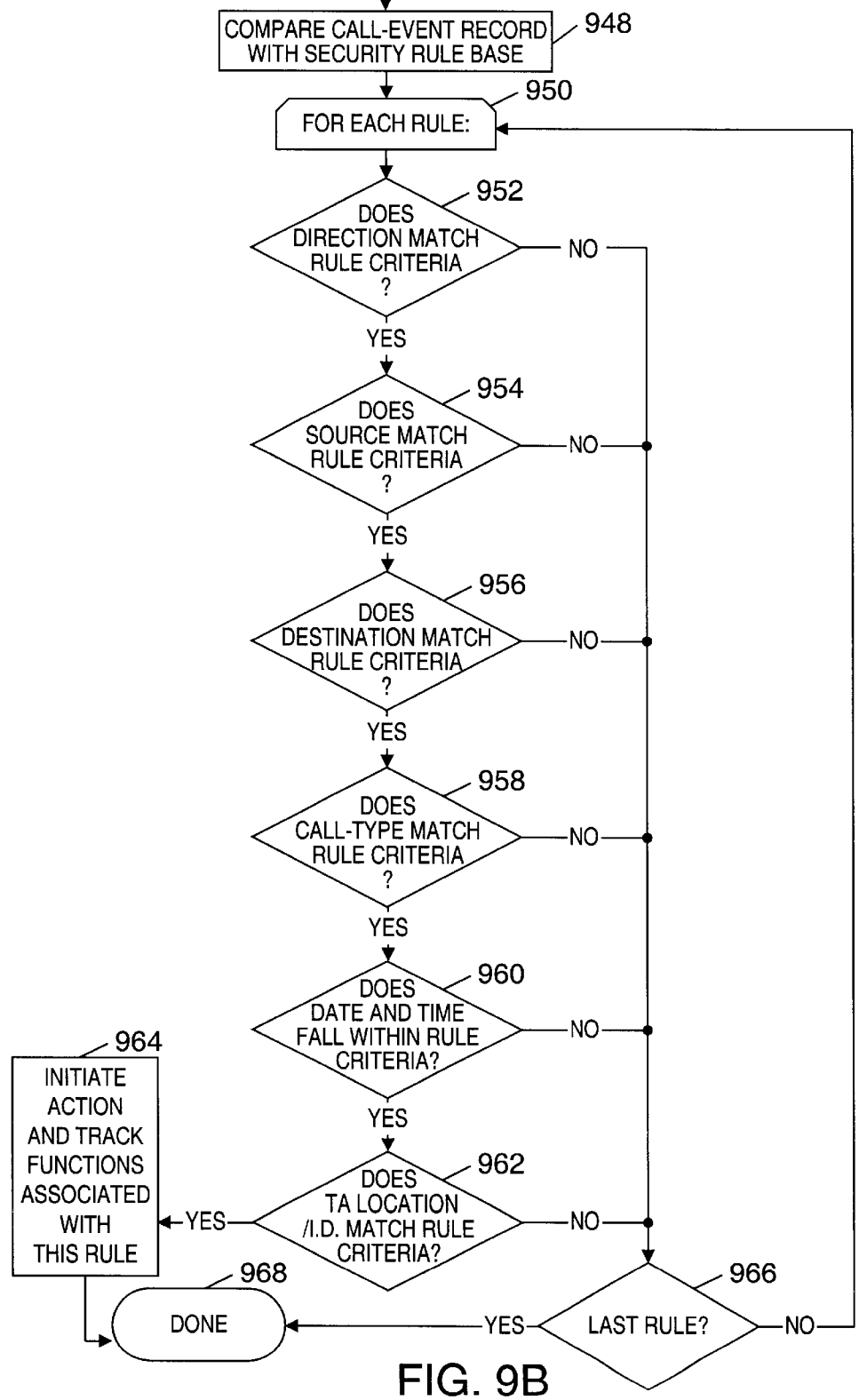

FIGS. 9A and 9B collectively illustrate a process flow diagram 900 whereby detection and analysis of call activity and implementation of the security rule base 402 are executed by the VPSTN 100, as previously mentioned with reference to steps 510–528 of FIGS. 5A and 5B. In FIG. 9A, steps 912–946 illustrate that the TA 102 captures and analyzes all available call attributes, analyzes call-activity, and then consolidates and reports details for further processing.

In particular, in step 912, call-progress signals on the line are captured and analyzed and a determination is made whether the call is an inbound call in step 914. If so, execution proceeds to step 916, in which the destination is set equal to the line map (i.e., the mapping of the individual station extensions 152 through the TA 102) so that the destination extension can be determined according to the line map, and the source is set equal to caller-ID (so that a caller identification device determines the source of the inbound call). In step 918, the available caller-ID or ANI information is decoded and recorded, and execution proceeds to step 930.

Referring again to step 914, if a negative determination is made (i.e., that the call is not an inbound call), execution proceeds to step 920, in which a determination is made whether the call is an outbound call. If a negative determination is made, execution proceeds to step 922, in which an exception is characterized in the call-event record. If the call is determined to be outbound, execution proceeds to step 924, in which the source is set equal to the line map (so the extension from which the call is made can be identified), and the destination is set equal to the dialed digits (indicating that the TA 102 determines the destination of the call). In step 926, the DTMF/MF signals are decoded and recorded to determine the number that was dialed, and execution proceeds to step 930.

In step 930, handshake signals are captured and analyzed, and data is demodulated in the case of both inbound and outbound calls for use in discriminating the call type of the call to be video, fax, modem, or voice in steps 932–944. In step 932, a determination is made whether the call is video, and if so, execution proceeds to step 934, in which the call-type of "video" is assigned to the call. If the determination in step 932 is negative, execution proceeds to step 936.

In step 936, a determination is made whether the call is fax, and if so, execution proceeds to step 938, in which the call type of "fax" is assigned to the call. If the determination in step 936 is negative, execution proceeds to step 940.

In step 940, a determination is made whether the call is modem, and if so, execution proceeds to step 942, in which the call-type of "modem" is assigned to the call. If the determination in step 940 is negative, execution proceeds to step 944 where the call type of "voice" is assigned to the call.

Upon completion of step 922, 934, 938, 942, or 944, execution proceeds to step 946, wherein all available call attributes (e.g., the call direction, source number, destination number, trunk group, trunk, channel ID, and call type), are consolidated in a concatenated call event record for use in implementing the security rule base 402. From step 946, execution proceeds to step 948 (FIG. 9B).

Referring now to FIG. 9B, in step 948, the TA 102 compares the determined call attributes within the call event record with rules in the security rule base 402. Rules are evaluated for a call event in sequential order. Steps 950–966 illustrate a process loop that is applied for each rule until either one rule's criteria meets the determined call attributes and an action is indicated for the current rule in step 964, or not all designated attributes in a rule (and hence no rule) meets the determined call attributes. The call attributes may include, but are not limited to, any Boolean combination (AND, OR, NOT) of the following: (1) direction of the call (i.e., inbound or outbound); (2) source telephone number, numbers, or mask (e.g., 210-402-XXXX) where the source number is the number of the party initiating the call (i.e., the extension assigned to a station for outbound calls, or the number extracted from caller-ID or any other means for inbound calls); (3) destination telephone number, numbers, or mask where the destination number is the number of the party receiving the call (i.e., the extension assigned to a station for inbound calls, or the number dialed, DTMF decoded or by any other means for outbound calls); (4) type of call, defined as either voice, fax, modem, or video; (5) date of call, defined as specific dates, ranges of dates, day(s)-of-week, or any combination thereof; (6) time of call, defined as specific times, ranges of times, time(s)-of-day, or any combination thereof; (7) the deployment location/identifier of the TA 102; and (8) any other call attribute listed with reference to the call log 304.

In particular, in step 952, a determination is made whether the call direction matches the rule criteria. If so, execution proceeds to step 954, in which a determination is made whether the source matches the rule criteria. If so, execution proceeds to step 956, in which a determination is made whether the destination matches the rule criteria. If the destination matches the rule criteria, execution proceeds to step 958, in which a determination is made whether the call type matches the rule criteria. If so, execution proceeds to step 960, in which a determination is made whether the date and time fall within the rule criteria. If so, execution proceeds to step 962, in which a determination is made whether the deployment location/identifier of the TA 102 (through which the call flows), matches the "install on" rule criteria. If the "install on" rule criteria matches the TA 102 deployment location/identifier, execution proceeds to step 964, in which the action and track functions associated with the matched security rule base 402 rule are initiated.

When the criteria of the security rule base 402 rule is matched, the TA 102 performs actions and track functions dictated by the rule in step 964, which may include: allow or deny the call and conduct the call in secure mode. The TA 102 notifies the management server 106 that the security rule base 402 rule has fired. The management server 106 references the fired security rule base 402 rule and performs track functions dictated by the rule, which may include: send notifications such as electronic mail notification, pager alerting, console messaging, or a SNMP trap notification, and logging the event. Execution terminates in step 968.

Referring again to step 952, 954, 956, 958, 960, and 962, if a negative determination is made in one of these steps, execution proceeds to step 966, in which a determination is made whether the current rule is the last rule to be evaluated. If not, execution returns to step 950 and the next rule is retrieved; otherwise, execution terminates in step 968.

Result Response Policy Enforcement

Figure 10A:
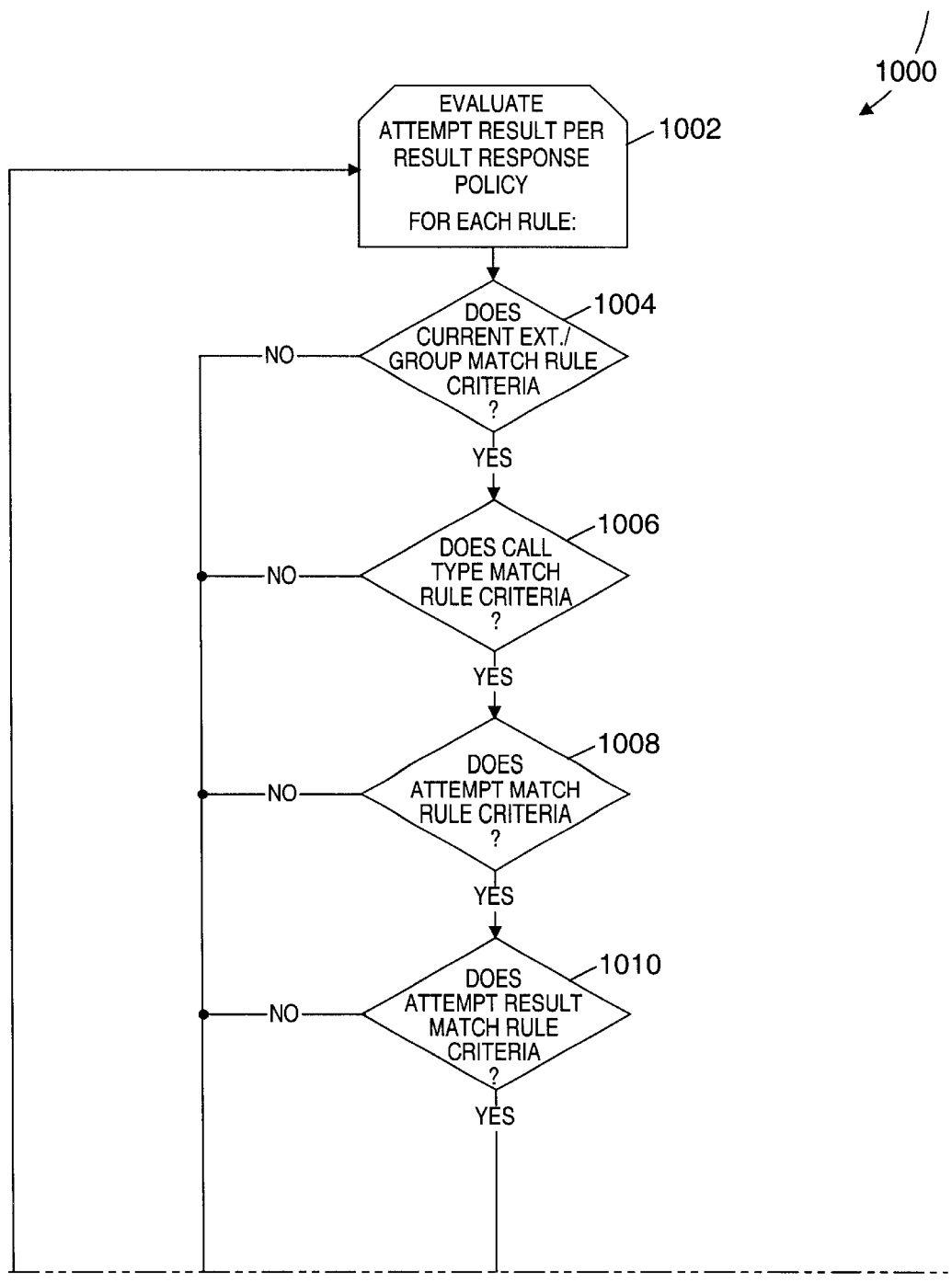
FIGS. 10A and 10B are a process flow diagram illustrating evaluation of the results of the secure call attempt and implementation of the result response policy by the virtual private switched telecommunications network of FIG. 1.
Figure 10B:
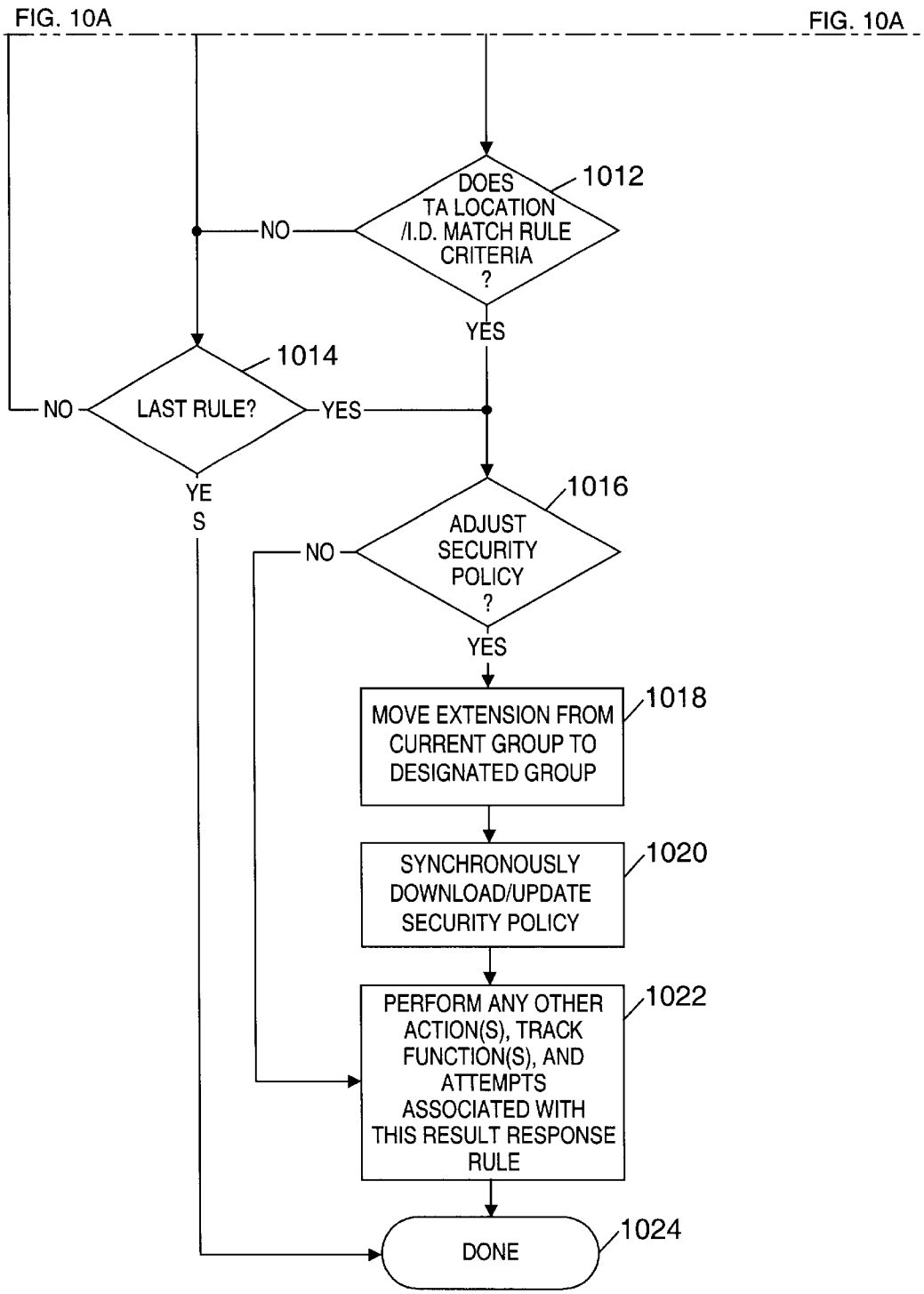

FIGS. 10A and 10B collectively illustrate a process flow diagram 1000 whereby evaluation of the results (success or failure) of the secure call attempt, and implementation of the result response policy 404, are executed by the VPSTN 100, as previously mentioned with reference to step 524–528 of FIG. 5B. In FIGS. 10A and 10B, steps 1002–1014 illustrate that the TA 102 applies a process loop, evaluating each result response policy 404 rule in sequential order until either one rule matches all designated attributes of the call and the attempt result, or no rule meets all criteria. It is understood that the VPSTN 100 is capable of operating in a continuous loop, initiating and executing secure calls while simultaneously performing appropriate actions pursuant to the security rule base 402 and result response policy 404.

Now referring to step 1002 in FIG. 10A, the TA 102 compares the result (success or failure) of the attempt to conduct the call in secure mode and the determined call attributes with the rules in the result response policy 404. The rule criteria may include, but is not limited to any Boolean combination (AND, OR, NOT) of the following: (1) current group, defined as the user group in which the inbound or outbound telephone number or extension is currently listed; (2) call type, defined as either voice, fax, modem, or video; (3) attempt, defined as the action or track function to be attempted, pursuant to the fired security rule base 402 rule (e.g., conducting the call in secure mode); (4) result, defined as the successful or failed execution of the attempted action or track function; (5) the deployment location/identifier of the TA 102; and (6) any other call attribute listed with reference to the call log 304.

In particular, in step 1004, a determination is made whether the call extension or the current group containing the call extension matches the rule criteria. If so, execution proceeds to step 1006, in which a determination is made whether the call type matches the rule criteria. If the call type attribute of the call matches the rule criteria, execution proceeds to step 1008. In step 1008, a determination is made whether the attempt made by the TA 102 (e.g. conduct the call in secure mode), matches the rule criteria. If so, execution proceeds to step 1010, in which a determination is made whether the result of the attempt (e.g. success or failed), matches the rule criteria. If so, execution proceeds to step 1012, in which a determination is made whether the TA 102 location/identifier matches the "install on" rule criteria. If so, execution proceeds to step 1016.

In step 1016, a determination is made whether the matched result response policy 404 rule dictates adjustment of the security policy 302. If so, execution proceeds to step 1018, in which the management server 106 moves the extension from its current designated group into a different, designated group, and execution proceeds to step 1020. If the security policy is adjusted, in step 1020, the management server 106 synchronously downloads the updated security policy 302 to any TA 102 that is designated to use that specific security policy 302 (shown in the "install on" column). In step 1022, the action(s), track function(s) and/or additional action(s) associated with the fired result response policy 404 rule are performed. Execution is complete in step 1024.

Referring again to steps 1004, 1006, 1008, 1010, and 1012, if a negative determination is made in any of these steps, execution proceeds to step 1014, in which a determination is made whether the current rule is the last rule to be evaluated in the result response policy 404. If not, execution returns to step 1002 and the next rule is retrieved for comparison; otherwise, execution is completed in step 1024.

The VPSTN DS-0 Channel Sample

The DS-0 channel is the atomic level (the lowest level) of a standard telephony call, regardless of whether the call is voice, fax, modem, or VTC. As previously mentioned, the DS-0 channel operates at 64,000 bps. The VPSTN 100 subdivides the VPSTN DS-0 channel sample into subrate channels. The term subrate is used because each of the channels operate below the full DS-0 channel rate of 64,000 bps. The subrate channels are assigned bit positions within the VPSTN DS-0 channel sample. It is understood that multiple embodiments of subrate channel locations and size (bit assignments) are possible, subdividing the VPSTN DS-0 channel sample into two or more subrate channels based on various factors such as DS-1 type, channel impairments, the designated encryption algorithm and encryption engine.

Figure 11A:
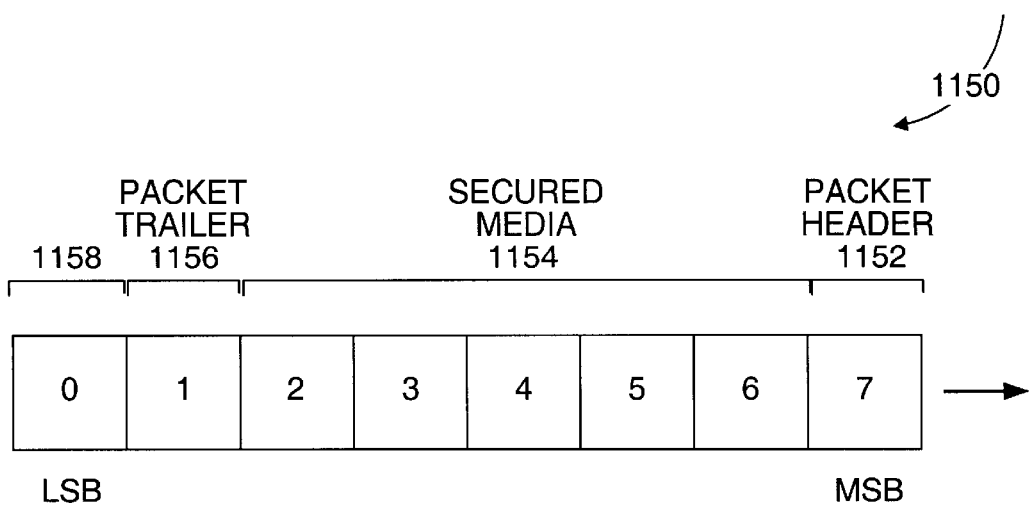
FIG. 11A is a schematic block diagram illustrating bit assignments in a virtual private switched telecommunications network digital signal level 0 (DS-0) channel sample.

FIG. 11A is a schematic block diagram illustrating bit assignments in an exemplary VPSTN DS-0 channel sample 1150 produced by the VPSTN 100 on a DS-0 operating at 56,000 bps, such as T1, E1, and J1 trunks, and ISDN PRI trunks with 56,000 bps links or line impairments. As discussed below, the VPSTN DS-0 channel sample 1150 is configured such that the VPSTN DS-0 packet can be transmitted and received over either the circuit switched PSTN 116 or a packet switched network to support secure voice over IP (VoIP).

The three subrate channels include a packet header channel 1152 (sometimes called a control, message, or synchronization channel), a secured media channel 1154 (sometimes referred to as a subrate bearer, barrier, or packet payload channel), and a packet trailer channel 1156. The secured media channel 1154 operates at a DS-0 subrate of 40,000 bps (5-bits per sample). The packet header channel 1152 and packet trailer channel 1156 each operate at a subrate of 8,000 bps (1-bit per sample). The three subrate channels add up to a rate of 56 (40+8+8) Kbps. The remaining 8 Kbps, is used for a Least Significant Bit (LSB) 1158 position.

The packet header channel 1152 is assigned bit position 7, which is the Most Significant Bit (MSB). The secured media channel 1154 is assigned bit positions, 2, 3, 4, 5, and 6, and the packet trailer channel 1156 is assigned bit position 1. In a DS-1 the MSB, bit position 7, is the first to be transmitted.

Each of the subrate channels are used to build the VPSTN DS-0 packet. For example, using the 3DES algorithm, the VPSTN 100 uses packets comprised of 256 samples. The VPSTN DS-0 packet of 256 samples is 32 milliseconds in length. The packet header channel 1152 and packet trailer channel 1156 use 1-bit out of each of the 256 samples, giving a total of 256-bits (32 bytes) for each channel. The secured media channel 1154 uses 5-bits out of each of the 256 samples, giving a total of 1,280 bits (160 bytes).

Figure 11B:
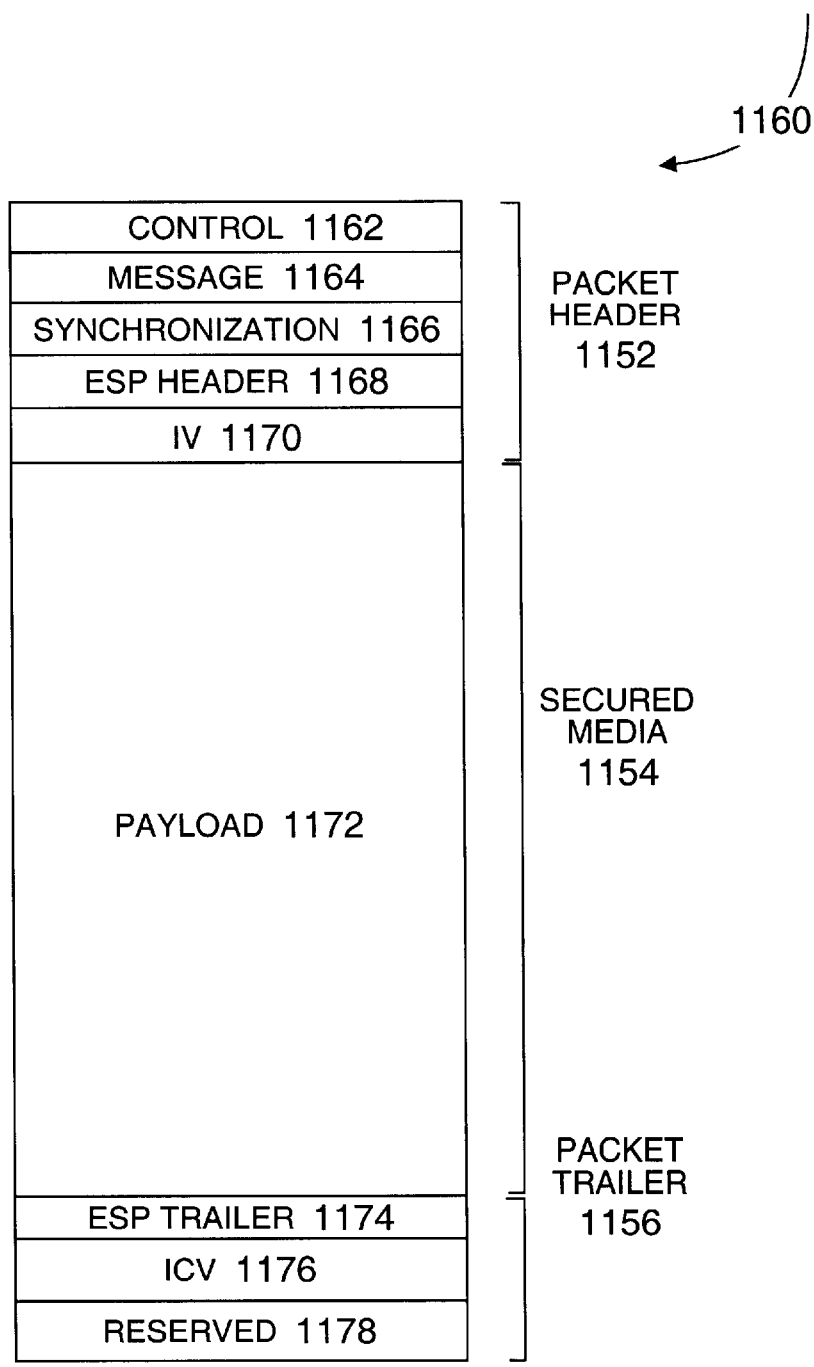
FIG. 11B is a schematic block diagram illustrating an example structure of the virtual private switched telecommunications network DS-0 channel sample of FIG. 11A.

FIG. 11B shows the structure of the VPSTN DS-0 packet made up of VPSTN DS-0 channel samples 1150. The packet header channel 1152 is further subdivided into five fields: a control field 1162; a message field 1164; a synchronization field 1166, a VoIP-compatible Encapsulating Security Payload (ESP) header field 1168; and an Initialization Vector (IV) field 1170.

The 32-bit control field 1162 is used to transmit control data from the TA 102 to the TA 104, and vice versa. The bit-0 within the control field 1162 indicates if encryption is enabled for that particular channel. If the TA 102 or 104 receives a packet with bit-0 within the control field 1162 set to 1, then the VPSTN DS-0 packet contains a secured media channel 1154 and decryption is required. Conversely, if the bit-0 within the control field 1162 is 0, the packet contains plaintext data and decryption is not necessary. Any set of bits or bit fields may be used to exchange control or status information between the TA 102 and the TA 104. For instance, in the preferred embodiment, the selection of the companding law is controlled by the transmitting TA, but in an alternate embodiment, such as a master/slave configuration, the bit-1 within the control field 1162 may be used to indicate the companding law used by the transmit channel (0=mu-law and 1=A-law).

The message field 1164 is used to pass messages between the TA 102 and the TA 104. Messages are used to setup a secure call, exchange and negotiate TA capabilities, exchange encryption keys, report errors, and control the call session. The message field 1164 remains active throughout the duration of a call, and is used to initiate or discontinue secure mode while a call is in progress.

The synchronization (sync) field 1166 is used to transmit a fixed bit synchronization pattern, thereby providing a means for delineating the boundaries of the VPSTN DS-0 packet. The VPSTN DS-0 packet boundary is not related to the framing performed by the PSTN 116, such as the D3/D4 framing or Extended Super Frame (ESF) formats. Since the probability that a non-VPSTN 100 device would randomly produce the synchronization pattern is very low, the pattern is also used to identify or confirm that the VPSTN DS-0 packet was transmitted by a VPSTN-capable TA 102 or 104.

The ESP field 1168 is another method of protecting the data payload of a packet from wrongful interception and tampering, based on a VoIP-compatible protocol. The ESP field 1168 provides confidentiality, data origin authentication, connection-less integrity, an anti-replay service, and limited traffic flow confidentiality.

The Initialization Vector (IV) field 1170 is used to transport encryption algorithm parameters, such as modulus length, crypto seed, and exponents. When using the DES or 3-DES algorithm, the IV field 1170 is used to initialize the algorithm with random data to perform the encryption.

The payload field 1172 carries the audio signal in a compressed format. It will be understood by those skilled in the art that a wide range of compression methods may be applied, but the ITU-T G.726 Recommendation, Adaptive Differential Pulse Code Modulation (ADPCM) in 5-bit mode is the preferred method for compressing the 8-bit Pulse Code Modulated (PCM) audio data, since ADPCM 5-bit mode (which operates at 40 K bps), provides voice quality equal to that of an uncompressed PCM DS-0 channel at 64 Kbps (i.e., toll quality).

The packet trailer channel 1156 is further subdivided into three fields: a VoIP-compatible ESP trailer field 1174; an Integrity Check Value (ICV) field 1176; and a reserved field 1178 containing the remaining unused bits.

The ESP trailer field 1174 contains a pad field and next header field required to pad the payload to an integer value of 64-bit DES blocks, for VoIP compatibility.

The ICV field 1176 is used to perform data integrity validation. It performs the same function as a checksum, but uses an IPSEC standard hash algorithm.

The LSB 1158 is discarded on receive channels and set high (1) on transmit channels. The LSB 1158 data is not used by the VPSTN 100 because the PSTN 116 may cause some LSB 1158 values to change during transport. Changes in the value of the LSB 1158 can be caused by robbed-bit signaling, transcoding (mu-law to A-law to mu-law), or digital Packet Assembler/Disassembler (PAD) circuits and other signal attenuating circuits. Additionally, the PSTN 116 uses the LSB 1158 for channel associated signaling (CAS), such as robbed bit signaling on a T1 trunk.

Figure 12:
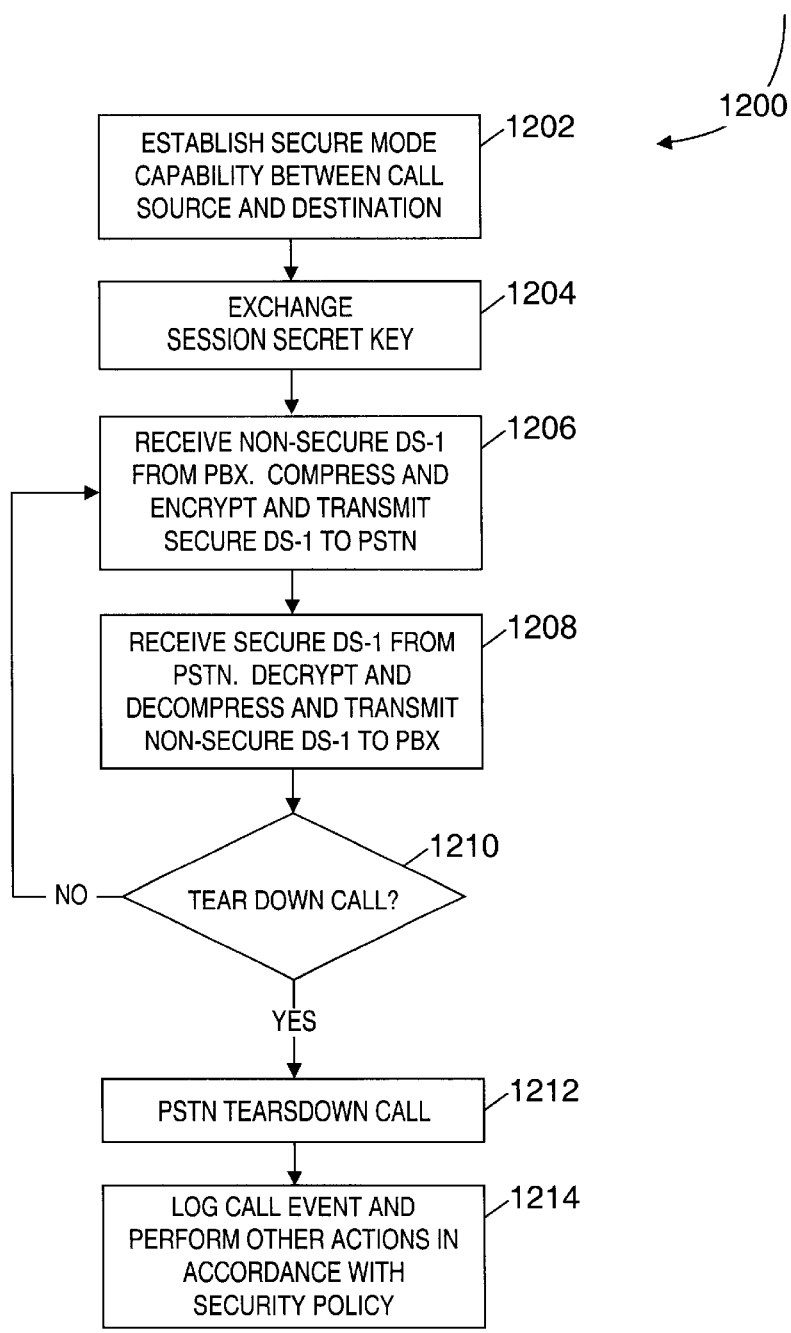
FIG. 12 is a process flow diagram illustrating conduction of a call in secure mode by the virtual private switched telecommunications network of FIG. 1.

FIG. 12 is a process flow diagram illustrating the process 1200 whereby the VPSTN 100 conducts a voice call in secure mode. In step 1202, (reference will also be made to the elements within FIG. 1 for this example), the PSTN 116 uses normal, non-secure telecommunications processes for connecting two terminals (e.g., telephone sets 148 calls telephone set 150). Responsive to the firing of the security policy 302 rule requiring secure communication, the TA 102 and the TA 104 perform an autodiscovery, synchronization, and negotiation process to establish whether, and under what conditions, the call between the two locations can be conducted in secure mode.

The session's secret key is established between the TA 102 and the TA 104 in step 1204. Various administrator-designated session keys and exchange methods are contemplated, including static keys, shared secret keys, Public Key Exchange (PKE)-transmitted session keys, digital certificates, or other key exchange mechanisms. In the case of static keys, no key exchange is required. Key exchange is performed in the message field 1164 (FIG. 11B). In the preferred embodiment, each call (session) has two unique secret keys. The TA 102 and the TA 104 each transmit their data key using PKE, thereby creating a unique session key for each transmit channel.

During the secure call setup in steps 1202 and 1204, the TA 102 may play a tone, silence, or some other audio enunciation to the telephone set 148, and the TA 104 may play a tone, silence, or other audio enunciation to the telephone set 150, pursuant to their respective security policies 302. Following establishment of the session keys, the TA 102 and the TA 104 begin encrypting the secured media channel 1154 (FIG. 11B).

In step 1206, the TA 102 PBX-in port 120 receives the non-secure DS-1 circuit data from the PBX 114. The TA 102 manipulates, compresses and encrypts the non-secure data bit stream, thereby generating the secure VPSTN DS-0 channel sample 1150 bit stream. The TA 102 PSTN-out port 122 transmits the secured DS-1 circuit data to the PSTN 116, where it is switched to the PBX 118.

In step 1208, the TA 104 PSTN-in port 128 receives the secure DS-1 circuit data from the PSTN 116. The TA 104 manipulates, decrypts and decompresses the secure data stream, thereby restoring the non-secure DS-1 circuit data that was previously compressed and encrypted in step 1206. The TA 104 PBX-out port 130 transmits the non-secure DS-1 circuit data stream to the PBX 118, which transmits the signal to the telephone 150.

While not shown, it is understood that the VPSTN 100 is capable of operating in a continuous loop, synchronously handling the flow of both the receiving and transmitting DS-0 channel data streams. The process loop continues until the call is "hung up." The PSTN 116 tearsdown the call using normal telecommunications processes for disconnecting the two phone sets 148 and 150, as shown in steps 1210 and 1212.

In step 1214, the call event is logged, and any other actions and track functions required by the security policy 302, such as generation of notifications are executed.

Figure 13A:
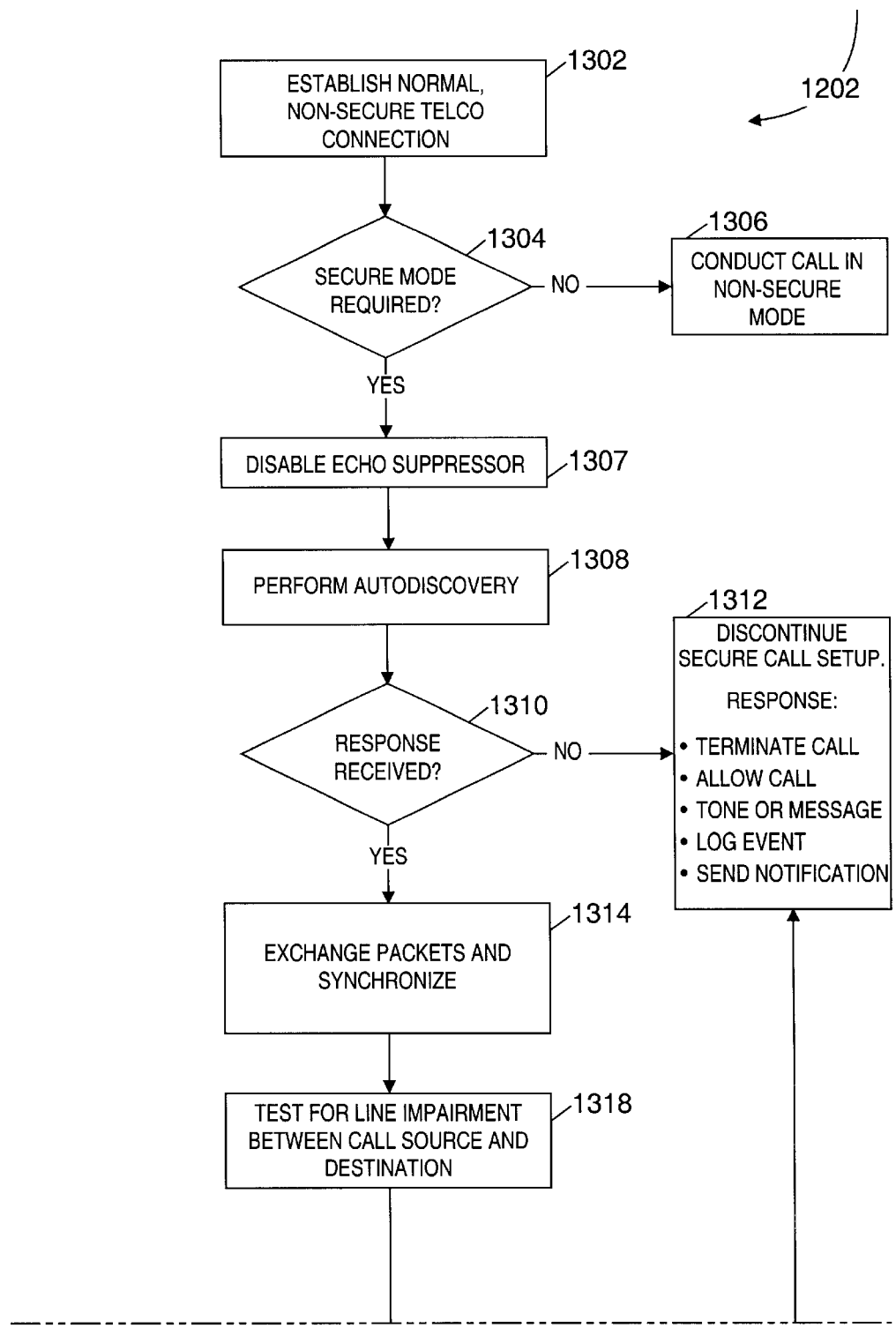
FIGS. 13A and 13B are a process flow diagram illustrating setup for a secure call.
Figure 13B:
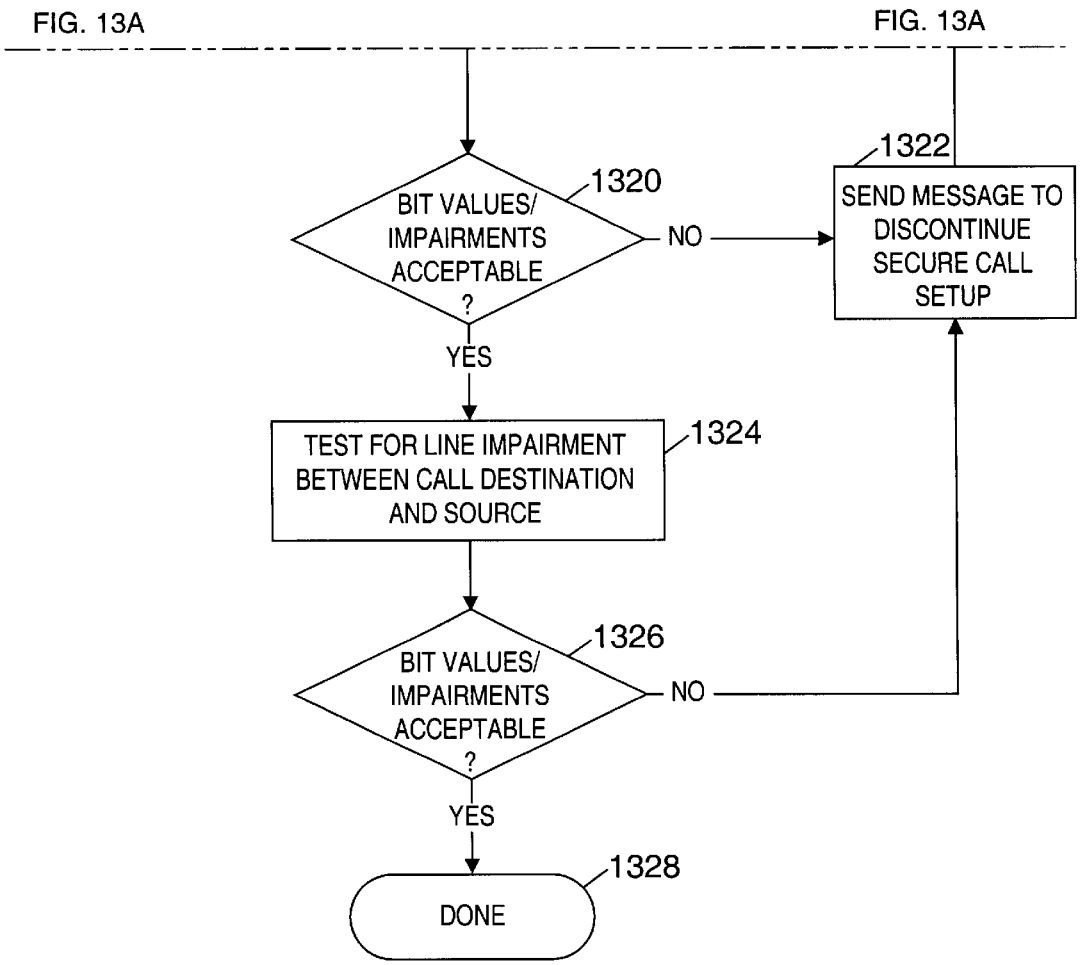

FIGS. 13A and 13B collectively show a process flow diagram for the secure call setup process 1202 of FIG. 12 whereby secure mode capabilities between the call source TA 102 and the destination TA 104 are established prior to exchange of the session secret key (reference will also be made to the elements in FIG. 1 for this flowchart). In step 1302, an audio connection is established between the telephone 148, PBX 114, PSTN 116, PBX 118, and the telephone 150 in the normal, non-secure method used for connecting two phone sets across the PSTN 116. Once the audio connection is established, two non-secure DS-0 channel data streams flow in a full duplex manner between the two phone sets.

In step 1304, the TA 102 determines whether the fired security policy rule dictates the call is to be conducted in secure mode, as previously mentioned with reference to steps 510–522 of FIGS. 5A and 5B and steps 912–964 of FIGS. 9A and 9B. In step 1304, if the fired security rule does not require the call to be conducted in secure mode, the call continues to be conducted in the normal, non-secure method used by the PSTN 116, in step 1306. If in step 1304, the TA 102 determines that the fired security rule requires the call to be conducted in secure mode, the TA 102 responds accordingly to perform an autodiscovery, synchronization, and negotiation process to setup a secure call with the TA 104, as described below.

In step 1307, when necessary (e.g., on connections which include T1, J1, or E1 spans), the TA 102 disables the PSTN 116 echo suppressor. The echo suppressor must be disabled because it hinders full duplex transmitted data. Full duplex transmission is necessary for encrypted data blocks to be synchronously transmitted and received by both the TA 102 and the TA 104. The TA 102 sends a message to the TA 104 to indicate that a echo suppressor disabler tone will be generated over the DS-0 channel for the next x seconds. When the TA 102 receives an acknowledge message from the TA 104, the TA 102 generates the disabler tone.

Shortly after audio establishment between the two telephones 148 and 150, an autodiscovery process 1308 is executed. Several methods of autodiscovery are contemplated. In one embodiment, the TA 102 sends an "invite" message packet in the message field 1164 of the packet header channel 1152 to the TA 104, and waits for a response. The invite message indicates that the TA 102 is attempting to initiate a secure call with the TA 104. The invite message also indicates the capabilities of the TA 102, such as compression and encryption options. If the TA 104 is not VPSTN-capable, or if there is no TA 104 at the destination, the TA 102 times-out while waiting for an acknowledge message from the TA 104. If the TA 102 times-out in step 1310, the TA 102 discontinues the secure call setup process 1202, and responds to the failure to setup a secure call in step 1312, pursuant to the security policy. If the TA 104 is VPSTN-capable, it receives the invite message and sends a "acknowledge" message in the transmit message field 1164 of the packet header channel 1152, which is received by the TA 102 in step 1310.

In an alternate embodiment of the autodiscovery process 1308 (e.g., for connections made up of ISDN PRI spans), after audio establishment, the TA 102 and TA 104 send continuous VPSTN DS-0 packets containing VPSTN DS-0 channel samples 1150. If the VPSTN 100 is deployed on the trunk carrying the call to the telephone 150, both the TA 102 and the TA 104 send VPSTN DS-0 packets containing the bit-0 within the control field 1162 set to 1, indicating encryption is enabled for that particular channel and the fixed-bit synchronization pattern in the synchronization field 1166 of the packet header channel 1152 (FIG. 11B). Since the probability that a non-VPSTN 100 device would randomly produce the synchronization pattern is very low, the pattern identifies that the VPSTN DS-0 packets were transmitted by a VPSTN-capable TA 102 and 104. If the TA 104 is not VPSTN-capable, or if there is no TA 104 at the destination, the TA 102 times-out while waiting for VPSTN DS-0 packets containing VPSTN DS-0 channel samples 1150 from the TA 104. If the TA 102 times-out in step 1310, the TA 102 discontinues the secure call setup process 1202, and responds to the failure to setup a secure call in step 1312, pursuant to the security policy.

In the preferred embodiment of the autodiscovery process 1308 for connections which include T1, J1, or E1 spans, after audio establishment, the TA 104, having received an inbound call firing a security policy 302 rule designating that the call is to be conducted in secure mode, sends a tone to the TA 102. The TA 102 responds by sending VPSTN DS-0 packets containing "silence" or "comfort noise" and the fixed bit synchronization pattern. Having sent the tone, the TA 104 waits to receive VPSTN DS-0 packets containing "silence" or "comfort noise" and the fixed bit synchronization pattern. After receiving the VPSTN DS-0 packets from the TA 102, the TA 104 sends VPSTN DS-0 packets containing "silence" or "comfort noise" and the fixed bit synchronization pattern to the TA 102. In this process, the tone identifies the called party as being VPSTN-capable and the synchronization pattern confirms the VPSTN DS-0 packet was transmitted by a VPSTN-capable TA 104. If the TA 102 is not VPSTN-capable, or if there is no TA 102 at the call source, the TA 104 times-out while waiting for VPSTN DS-0 packets containing "silence" or "comfort noise" and the fixed bit synchronization pattern from the TA 102. If the TA 104 times-out in step 1310, the TA 104 discontinues the secure call setup process 1202, and responds to the failure to setup a secure call in step 1312, pursuant to the security policy.

In step 1312, the security policy may require one or more of the following responses by the TA 102 and management server 106 if the secure call setup process 1202 is discontinued: terminate the call; allow the call to continue in non-secure mode; provide a warning tone or message indicating to the local call party that the call is not secure; log the event; or send notifications to designated personnel.

In step 1314, the TA 102 and the TA 104 each detect the synchronization pattern in the exchanged packets and "sync up."

The TA 102 and the TA 104 exchange messages to determine the existence of line impairments of the two DS-0 channels flowing between the TA 102 and the TA 104 in step 1318. The TA 102 sends a payload over the secured media channel 1154, the content of which is "known" by both the TA 102 and the TA 104. The TA 104 compares the received payload with the known payload and determines if line impairments changed some of the secured media channel known bit values during transmission of the payload from the TA 102 to the TA 104.

If in step 1320, the TA 104 determines that bits have changed value during transmission and line impairments are too severe to be overcome by Digital Impairment Learning (DIL), the secured media channel 1154 cannot support the VPSTN process 1200. If this is the case, the TA 104 sends a message telling the TA 102 to discontinue the secure call setup process 1202, in step 1322. Upon receipt of the discontinue message, the TA 102 and management server 106 respond to the failure to conduct the call in secure mode (terminate call, allow call, provide warning tone or message, log the event, send notifications, etc.), pursuant to the security policy, in step 1312.

If in step 1320, the TA 104 determines that bit values have not changed during transmission or that line impairments can be overcome by DIL, the line impairments test is repeated on the return DS-0 channel in step 1324.

If in step 1326, the TA 102 determines that bit values have changed during the transmission and line impairments are too severe to be overcome by DIL, the TA 102 discontinues the secure call setup process 1202. The TA 102 and management server 106 respond to the failure to conduct the call in secure mode, pursuant to the security policy (terminate call, allow call, provide warning tone or message, log the event, send notifications, etc.), in step 1312. If the TA 102 determines that bit values have not changed or that line impairments can be overcome by DIL, the secure call setup process terminates in step 1328.

Although it is not shown, it is understood that the result response policies discussed herein may be configured such that in step 1312 of FIG. 13A, the call is allowed or denied based on at least the failure and the cause of failure to conduct the call in secure mode determined in step 1310 or 1320 (e.g., the TA 104 is not VPSTN-capable, there is no TA 104, the TA 104 determined line impairments, or the TA 102 determined line impairments).

Distributed Deployment

Figure 14:
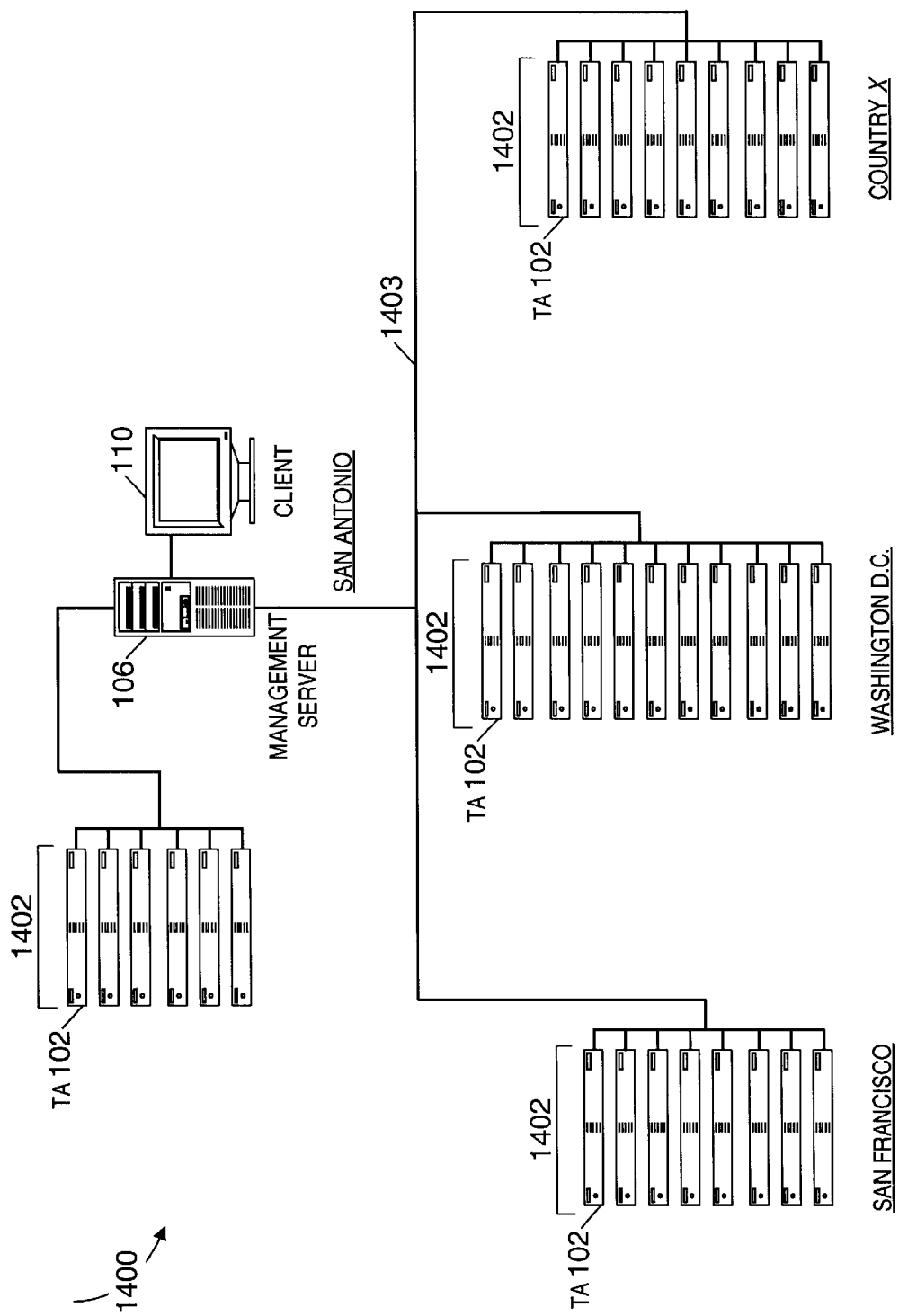
FIG. 14 is a schematic block diagram illustrating distributed deployment of the virtual private switched telecommunications network of FIG. 1.

In FIG. 14, reference numeral 1400 designates an alternative embodiment of the VPSTN 100 of FIG. 1, featuring a distributed deployment thereof. Due to their distributed nature, many companies are challenged to enforce a telecommunications security policy across their organization. The VPSTN 1400 enables a distributed organization to limit duplication of effort and ensure consistent application of the security policy 302 across multiple locations. Although the VPSTN 1400 components are necessarily distributed, policy can be dictated centrally. This requires an organization to configure and control security devices in a top-down fashion. In order to assess the company-wide security posture, detailed visibility into the entire organizational data stream is provided by collection at the device level, reporting up the management chain, consolidating multiple reports at the management server 106 for viewing, report filtering/configuration, and printing at the client 110.

The VPSTN 1400 depicted in FIG. 14 supports distribution of one or more of the TA 102 (represented by numeral 1402) in remote locations, all interconnected by a TCP/IP-based LAN, private WAN, or the Internet (any of which are identified herein with numeral 1403). With this type of configuration, a geographically separated organization can leverage security expertise in one central location by consolidating the security events and attempt results of the distributed TA 102 with the responses of the management server 106, all on one client 110.

Multi-Tiered Policy-Based Enforcement of a Security Policy

In FIGS. 15A and 15B, reference numeral 1500 represents an alternative embodiment of the VPSTN 100 of FIG. 1, featuring a system and method of multi-tiered policy-based enforcement of a security policy 1540 across a large, globally distributed enterprise.

The method of distributed deployment previously discussed and illustrated in FIG. 14 is applicable for a small- to medium-sized distributed organization, but processing all the security events from the hundreds of TA 102 that would be deployed in a medium- to large-sized globally distributed enterprise would quickly overload a lone management server 106. Additionally, a single management server 106 would not provide the remote locations with a degree of control over, or visibility into, their own security status.

As illustrated in FIGS. 15A and 15B, a management server 106 and client 110 installed at each location (such as San Antonio 1502, San Francisco 1504, Chicago 1506, Washington D.C. 1508, Country X 1510, Denver 1512, St. Louis 1514, Pittsburgh 1516, New York City 1518, and Atlanta 1520), will divide traffic load and allow management and implementation of the security policy 1540 on a more localized basis. Unfortunately, deployment of multiple independent VPSTN 100 makes it difficult to ensure the same basic security structure across the enterprise. Additionally, consolidation of local logging information to provide visibility into important local security events at the highest corporate level is difficult and labor-intensive.

The VPSTN 1500 (i.e., a multi-tiered policy-based enforcement of the security policy 1540 within a distributed architecture), ensures implementation of a basic, enterprise-wide security policy 1540 with a degree of localized policy control, as well as automatic security event log consolidation and visibility into important local security events at the highest corporate level.

As shown in FIGS. 15A and 15B, within a multi-tiered management environment, a "corporate" level 1522 management server 1528 oversees its own local management server 106 at San Antonio 1502 as well as multiple "regional" level 1524 management servers 106 at San Francisco 1504, Chicago 1506, and Washington D.C. 1508.

These "regional" management servers oversee multiple "branch" level 1526 management servers 106 at Country X 1510, Denver 1512, St. Louis 1514, Pittsburgh 1516, New York City 1518, and Atlanta 1520. Each management server 106 within the multi-tiered environment 1500 enforces the security policy 1540 for its local one or more TA 102, and in accordance with the management server tier position, may also oversee management servers below it. Each location is interconnected by a TCP/IP-based LAN, private WAN, or the Internet (any of which are identified herein with numeral 1530). For the purpose of simplification, the examples will pertain to the "corporate" level 1522 management server 1528 in San Antonio 1502 overseeing the "regional" level 1524 management server 106 in San Francisco 1504, which will oversee the "branch" level 1526 management server 106 in Country X 1510 and the "branch" level 1526 management server 106 in Denver 1512.

Just as a CEO imparts guidelines of conduct to his VPs, who in turn impart fundamentally similar guidelines to their Directors, so does the "corporate" level 1522 management server 1528 define a basic security policy 1540 to the "regional" level 1524 management server 106 in San Francisco 1504, that in turn disseminates a fundamentally similar security policy to the "branch" level 1526 management server 106 at Country X 1510 and Denver 1512.

For example, a corporate-dictated security policy 1540 will contain basic rules (i.e., a security rule base 1542 and a result response policy 1544). These rules are classified as either "Required" or "Optional". Each level of the hierarchical environment must adhere to a required rule, but can choose to ignore optional rules. Each level of the tier is capable of making their local rules and the rules for the tiers below it more stringent than the corporate-dictated rules, but can not make the rules more lax. In this way, a basic security structure is ensured across the enterprise.

The corporate-dictated security policy 1540 contains basic security rules that dictate what information will be reported upward, thereby providing visibility into only the most important local security events at the corporate level. Just as the corporate-dictated rules send security guidelines that may become more stringent as the rules are passed downward, the policy institutes an information filter that becomes more selective as electronic mail, logs and reports, etc., are routed upward. The tasks in the "Tracks" column of the corporate-dictated rule (such as electronic mail notification, pager notification, logging of events, etc.), that are of interest at a local level but are not of interest at higher levels, are designated to be filtered out if notification of a rule firing is to be routed up the tier. All logging is real-time, both at the location where the event occurs and at upper levels of the organization that, pursuant to the security policy 1540, may or may not require notification of the event.

FIGS. 15C, 15D and 15E, collectively illustrate rules in an exemplary security rule base 1542, for use in implementing multi-tiered policy-based enforcement of the security policy 1540. Although not shown, it is understood that the result response policy 1544 is similarly configured. As previously mentioned with respect to the security rule base 402 shown in FIG. 4 and FIGS. 7A–7B, rules based upon call attributes including "Direction;" "Source;" "Destination;" "Call type;" "Date;" "Time;" and "Duration" (not shown); implement an "Action" (allow or deny the call); other additional actions and logging, reporting and notification functions, "Track." Additionally, each rule has the TA 102 deployment location/identifier "Install On", allowing an enterprise to implement one single security rule base 1542 containing rules designated to be applied in specific locations. As shown in FIGS. 15C–15E, when implementing multi-tier policy-based enforcement, the attributes of the rules are expanded to include "Class", a classification of adherence to a rule as either "Required" or "Optional" or "Local". Any rule that is not a corporate-dictated rule will be designated as a local rule. If notification of a rule "firing" is to be routed up the tier to the management server 1528, "Route" will appear in the "Track" column, dictating that when a management server 106 is notified by a subordinate management server 106 that a rule has fired, the notification will be routed upward to the next higher-tiered management server 106. Additionally, if notification of a rule "firing" is to be routed upward, tasks listed in the "Track" column are designated to be filtered (F), if execution of the task should take place only at the location where the rule originally fired and the local TA 102 notified the management server 106. By filtering the tasks in the "Track" column, the policy will designate which tasks, such as event logging will be performed at each level of the tier, when a rule "fires" at a subordinate level of the tier.

Rules 1–10, are explained as follows, it being understood that the security rule base 1542 for multi-tiered policy-based enforcement of the security policy 1540 shown in FIGS. 15C–15E may include any number and types of rules, and that each rule is evaluated in sequential order, exiting after any one rule matches all the call criteria.

Rule 1:

This rule states "Deny outbound calls from extensions in the VPSTN non-secure group, generate an electronic mail and page, and log the call." This rule is installed on all TA 102. This rule identifies and segregates lines and denies calls over the lines which are in the VPSTN non-secure group and logs the call for accounting purposes. Adherence to this rule is required. Since the firing of this rule is an indication of security posture, it is of interest to the upper echelon. As notification of the rule "firing" is made at each upper level of the hierarchy, the event is logged, but electronic mail and pager notification is filtered out. Note that (F) designates that the tasks of generating electronic mail and pager notification is filtered out. Generation of an electronic mail and pager notification takes place only at the location where the TA 102 notifies the management server 106 that the rule "fired."

Rule 2:

This rule states "Deny inbound calls to extensions in the VPSTN non-secure group, generate an electronic mail and page, and log the call." This rule is installed on all TA 102. This rule identifies and segregates lines and denies calls over the lines which are in the VPSTN non-secure group and logs the call for accounting purposes. Adherence to this rule is required. Since the firing of this rule is an indication of security posture, it is of interest to the upper echelon. As notification of the rule "firing" is made at each upper level of the hierarchy, the event is logged, but electronic mail and pager notification is filtered out. Generation of an electronic mail and pager notification takes place only at the location where the TA 102 notifies the management server 106 that the rule "fired."

Rule 3:

This rule states "Allow inbound fax calls to extensions in the fax group between 9 pm and 6 am, conduct the call in secure mode, and log the call." This rule is installed on all TA 102 in San Antonio 1502. This rule causes all inbound fax calls to a specified inbound destination during a specified time to be conducted in secure mode and logs the call for accounting purposes. This rule is local to San Antonio 1502 and the upper level of the tier is not notified that the rule "fired."

Rule 4:

This rule states "Allow inbound modem calls to extensions in the daily receivable modem group, conduct the call in secure mode, and log the call." This rule is installed on all TA 102 in San Antonio 1502. This rule causes all inbound modem calls to a specified inbound destination to be conducted in secure mode and logs the call for accounting purposes. This rule is local to San Antonio 1502 and the upper level of the tier is not notified that the rule "fired."

Rule 5:

This rule states "Allow all outbound international voice, fax, modem, and VTC calls to Country X, conduct the call in secure mode, and log the call." This rule is installed on all TA 102. This rule causes all outbound voice, fax, modem, and VTC calls to any destination within Country X to be conducted in secure mode and logs the call for accounting purposes. Adherence to this rule is required. Upper levels of the tier are not notified that the rule "fired."

Rule 6:

This rule states "Allow all inbound international voice, fax, modem, and VTC calls from Country X, conduct the call in secure mode, and log the call." This rule is installed on all TA 102. This rule causes all inbound voice, fax, modem, and VTC calls from any source within Country X to be conducted in secure mode and logs the call for accounting purposes. Adherence to this rule is required. Upper levels of the tier are not notified that the rule "fired."

Rule 7:

This rule states "Allow inbound and outbound voice, fax, modem, and VTC calls between extensions in the inter-branch groups, conduct the call in secure mode, and log the call." This rule is installed on all TA 102. This rule causes all inbound and outbound voice, fax, modem, and VTC calls to and from specified sources and destinations to be conducted in secure mode and logs the call for accounting purposes. Adherence to this rule is required. Upper levels of the tier are not notified that the rule "fired."

Rule 8:

This rule states "Allow outbound voice, fax, modem, and VTC calls from extensions in the exec staff and engineering groups, conduct the call in secure mode, and log the call." This rule is installed on all TA 102. This rule causes all outbound voice, fax, modem, and VTC calls from specified outbound sources to be conducted in secure mode and logs the call for accounting purposes. Adherence to this rule is optional but recommended for security purposes. Upper levels of the tier are not notified that the rule "fired."

Rule 9:

This rule states "Allow inbound voice, fax, modem, and VTC calls to extensions in the exec staff and engineering groups, conduct the call in secure mode, and log the call." This rule is installed on all TA 102. This rule causes all inbound voice, fax, modem, and VTC calls to specified inbound destinations to be conducted in secure mode and logs the call for accounting purposes. Adherence to this rule is optional but recommended for security purposes. Upper levels of the tier are not notified that the rule "fired."

Rule 10:

This catch-all rule states "Deny all calls, generate an electronic mail and log the call." This rule is installed on all TA 102. Adherence to this rule is required. At first glance, this rule seems to deny any call to or from anywhere. This is not the case. This rule is typically placed at the bottom of the sequential list of rules to deny and log all calls that do not fit into any of the preceding rules. Since this rule is typically placed at the bottom of the sequential list of rules to deny and log all calls that do not fit into any of the preceding rules, the firing of the rule is an indication of the security posture, and of interest to the upper echelon. As notification of the rule "firing" is made at each upper level of the hierarchy, the event is logged, but the electronic mail notification is filtered out. Generation of an electronic mail notification takes place only at the location where the TA 102 notifies the management server 106 that the rule "fired." Again, each rule is evaluated in sequential order, exiting immediately after any one rule matches all the call criteria.

Figure 15F:
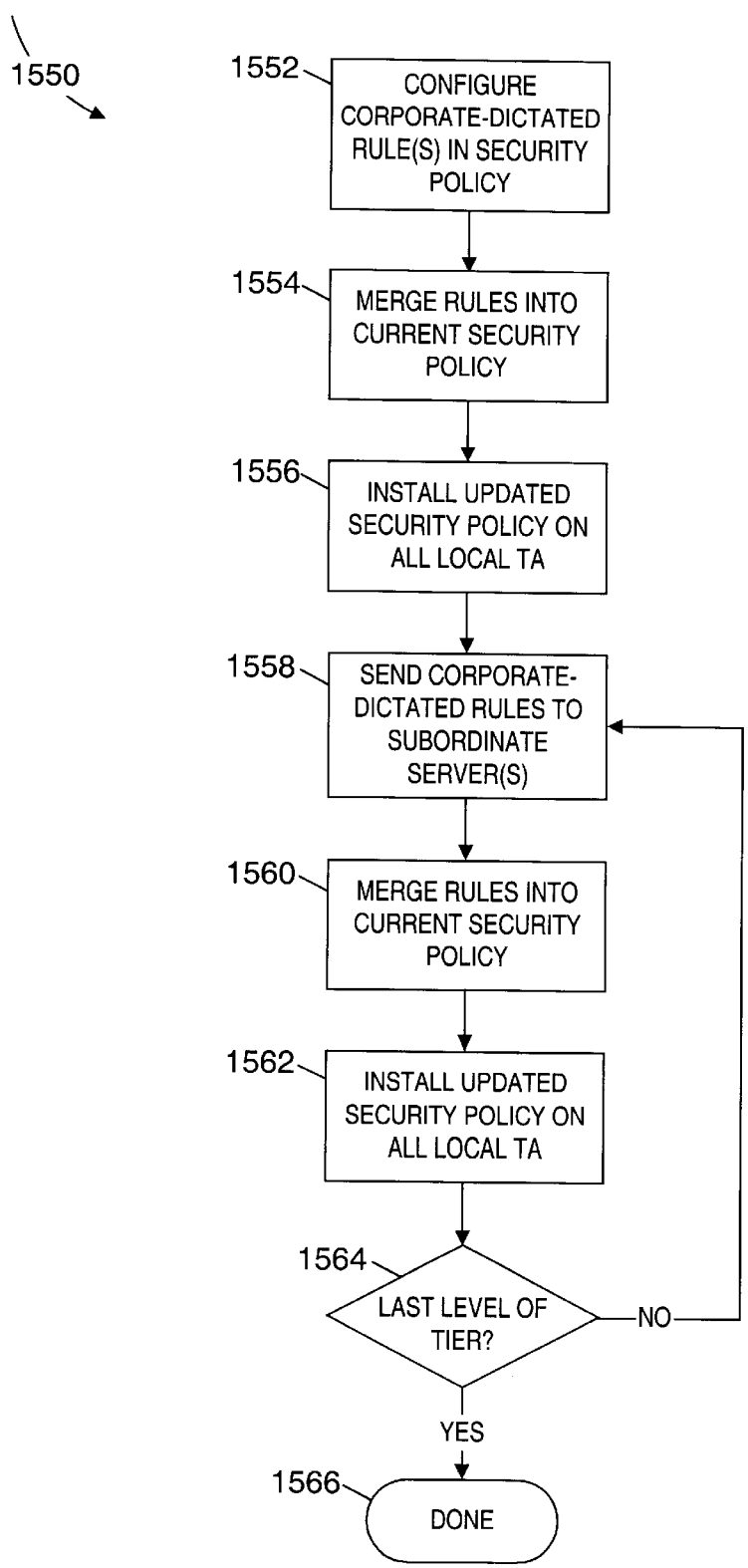
FIG. 15F is a process flow diagram illustrating implementation of the multitiered policy-enforcement of the security policy.

FIG. 15F is a process flow diagram 1550 illustrating the implementation of a multi-tiered policy-enforcement of the security policy 1540. It is understood that this process can be implemented during step 506 and 508 of the installation, configuration, and operation process discussed previously in FIGS. 5A and 5B, or at any time afterward, since the corporate-dictated rules will have priority over and remove any conflicting local rule.

Referring to FIG. 15F, in step 1552, corporate-dictated rules, similar to those described previously with reference to FIGS. 15C–15E, are defined. The corporate-dictated rules are included in the basic security policy 1540 that is distributed downward from the "corporate" level 1522 management server 1528 to each "regional" level 1524 management server 106 (such as the one in San Francisco 1504), and to each "branch" level 1526 management server 106 (such as those in Country X 1510 and Denver 1512). In step 1554, the corporate-dictated rules are merged into the current security policy 1540. As mentioned previously, the corporate-dictated rules will have priority over and remove any conflicting rules. In step 1556, the updated security policy 1540 is downloaded to the local TA 102 on the "corporate" level 1522.

Steps 1558–1564 illustrate a recursive process by which the updated security policy 1540 is downloaded to each management server 106 and its associated TA 102 on each level 1524 and 1526 of the tier, until the process has been performed on the lowest level of the tier. In particular, in step 1558, the updated security policy 1540 is sent to the management servers 106 on the "regional" level 1524; e.g. the management server 106 in San Francisco 1504. In step 1560, the new corporate-dictated rules are merged with the currently existing rules in the San Francisco 1504 management server 106.

In step 1562, the updated security policy 1540 is downloaded to the local TA 102 of the San Francisco 1504 management server 106. In step 1564, a determination is made whether the current level (in this case, the San Francisco 1504 management server 106), is the last level of the tier or whether it has supervisory responsibilities of other management servers, such as those on the "branch" level 1526. If it is determined that the current level is not the last level of the tier (i.e., the current management server 106 has supervisory responsibilities), execution returns to step 1558 and steps 1558–1562 will be repeated; as will be the case for the dissemination of the new security policy 1540 to the management server 106 in Country X 1510 and Denver 1512. If a positive determination is made in step 1564, i.e., when the corporate-dictated rules have been disseminated to the management servers 106 and the TA 102 populating each level of the tier, the process is complete and execution terminates in step 1566.

It should be understood that the rules comprising this basic security structure can be modified and sent down the tier at any time. While the corporate-dictated rules can be modified completely at the "corporate" level 1522 and pushed downward, the security administrators on other levels, such as the "regional" level 1524, can only accept the rules as is or make the rules to be sent downward to the "branch" level 1526 more stringent.

Figure 15G:
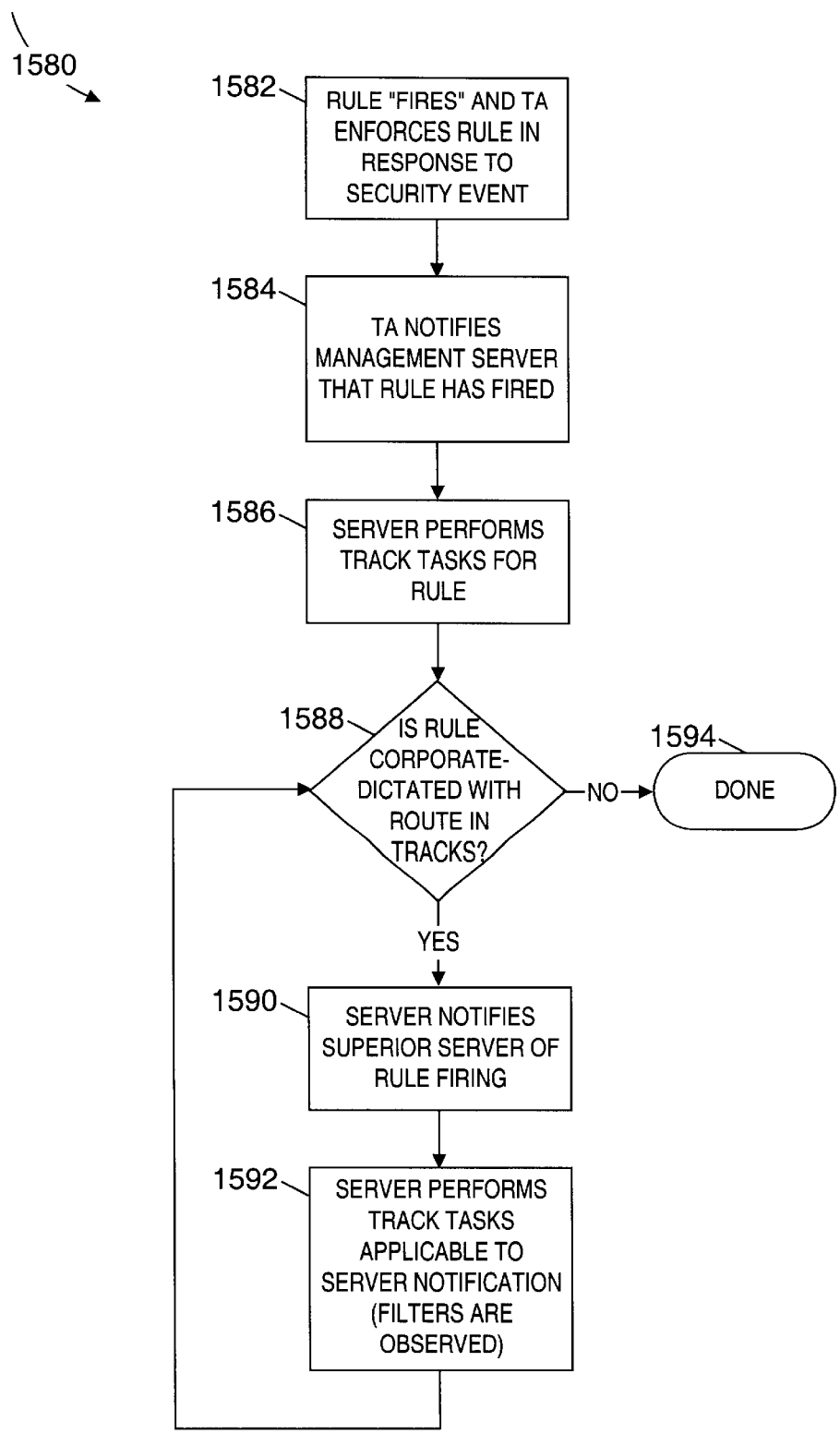
FIG. 15G is a process flow diagram illustrating implementation of filtering on "Track" tasks in a multi-tiered policy-enforced environment.

FIG. 15G is a process flow diagram 1580 illustrating the implementation of filtering on logging and execution of other "Track" tasks in a multi-tiered policy-enforced environment. It is understood that this filtering process can be applied to any task that may occur in the "Track" column of the security policy 1540.

Referring to FIG. 15G, in step 1582, the TA 102 evaluates the attributes of a call (direction, source, destination, type of call, etc.), against the sequential list of rules in the security policy 1540. When an applicable rule is found, the rule "fires" and the TA 102 enforces the rule. In step 1584, the TA 102 notifies its associated management server 106 that the specific rule has fired and that the rule has been enforced. In step 1586, the management server 106, pursuant to the rule in the security policy 1540, automatically executes the tasks designated in the "Track" column of the rule, such as generating an electronic mail notification and logging the event.

Steps 1588–1592 illustrate a recursive process by which the management server 106 on each level of the multi-tiered hierarchy receives notification of the rule having been fired, executes "Track" tasks for the rule, and notifies its supervisory management server 106 that the rule has "fired," until the notification reaches the top level of the tier. In particular, in step 1588, the rule is evaluated to determine if it is a corporate-dictated rule, and if notification of the rule "firing" will be routed up the tier in accordance with the "Route" task in the "Track" column. If the notification of the rule firing is to be routed upward, execution proceeds to step 1590, in which the management server 106 will send a notification of the rule firing to its supervisory management server 106.

Execution then proceeds to step 1592, in which, upon receiving notification routed from a subordinate management server 106 that a rule has fired, the supervisory management server 106 will execute all "Track" tasks in the rule, such as logging, that are not filtered, and then route a notification of the rule firing to its supervisory management server 106. Execution then returns to step 1588. This recursive process will continue until the notification and logging reach the "corporate" level 1522 management server 1502 which will consolidate all logging and reports for the enterprise. Referring again to step 1588, if a negative determination is made, execution terminates in step 1594.

Virtual Private Switched Telecommunications Network Complemented with Computer Telephony Integration Interface It is understood that the VPSTN 100 can take many forms and embodiments. For example, the VPSTN 100: may be complemented with computer telephony integration (CTI) interface(s) to specific PBXs 114. In this alternate embodiment, the VPSTN 100 may issue commands to the PBX 114 (via the CTI interface), for the PBX 114 to perform designated actions on the call. Additionally, the PBX 114 may provide designated call attributes to the VPSTN 100 (via the CTI interface), for use in applying the security rule-set to the call. Action commands issued to, and call attributes provided by the PBX 114 are pursuant to the rule-set and within PBX 114 capabilities.

Figure 16:
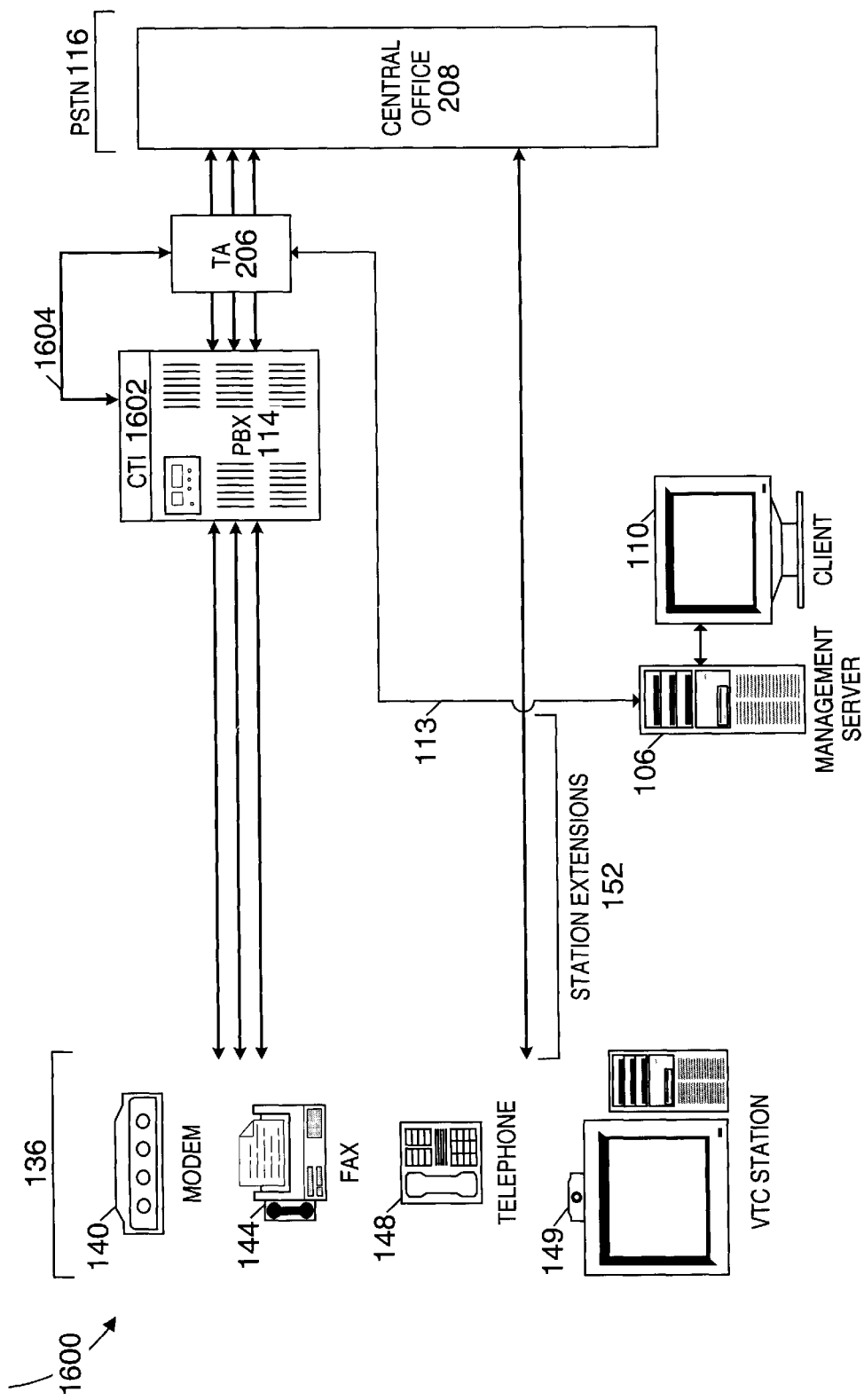
FIG. 16 is a schematic block diagram illustrating use of computer telephony integration to complement the portion of the virtual private switched telecommunications network of FIG. 2.

In FIG. 16, the reference numeral 1600 represents an alternate embodiment of the VPSTN 100 shown and described in FIG. 1 and FIG. 2, whereby the VPSTN 100 is complemented with a CTI interface 1602 to PBX 114. Accordingly, all previously described operations and functions of the VPSTN 100 are hereby inserted by reference into the VPSTN 1600.

The VPSTN 1600 consists primarily of the TA 102 connected in-line between the end-user stations 136 of an enterprise and the stations' connections into the PSTN 116 at the TA 206. Ethernet cabling and a serial port connection (or special connection) 1604 connects the TA 206 to the CTI interface 1602, which is connected to or located within the PBX 114.

In this embodiment, the PBX 114 provides call attribute information to the TA 206 via the CTI interface 1602, for the process of detecting and analyzing call activity discussed previously with reference to step 510 in FIG. 5A, and FIGS. 9A and 9B. Call attributes provided by the PBX 114 to the TA 206 are limited only by user configuration and the PBX 114 capabilities, and may include, for example: station extension, trunk, channel, inbound call number, outbound call number, call type, call date, call time, call duration. It is understood that the call attributes described herein as provided by the PBX 114 are expanded upon pursuant to PBX 114 capabilities. Different combinations of TA 206-provided and PBX 114-provided attributes are contemplated, such that all or only selected attributes are provided by the PBX 114.

Additionally, in this embodiment, the TA 206 issues commands to the PBX 114 via the CTI interface 1602, and thereby tasks the PBX 114 to perform actions and track functions associated with the call, pursuant to the security policy 302, during the process of security policy enforcement discussed previously with reference to steps 512–528 in FIGS. 5A–5B, and FIGS. 10A and 10B. Action and track function commands sent to the PBX 114 are limited only by user configuration and the PBX 114 capabilities, and may include, for example: allow the call, deny (terminate) the call, conduct the call in secure mode, generate electronic mail, pager, console messaging, and SNMP notifications, and log the event. It is understood that the actions and track functions described herein as performed by the PBX 114 are expanded upon pursuant to PBX 114 capabilities. Different combinations of TA 206-performed and management server 106-performed actions and PBX 114-performed actions are contemplated, such that all or only selected actions and track functions are performed by the PBX 114.

It is understood that the present invention can take many forms and embodiments. The embodiments shown or discussed herein are intended to illustrate rather than to limit the invention, it being appreciated that variations may be made without departing from the spirit of the scope of the invention. For example, any number of different rule criteria for the security policy may be defined. Different attributes and rules are contemplated. The algorithms and process functions performed by the system may be organized into any number of different modules or computer programs for operation on one or more processors or workstations within the system. Different configurations of computers and processors for the system are contemplated, including those in which the functions of the management server 106 may be inserted into the system at the TA 102. The programs used to implement the methods and processes of the system may be implemented in any appropriate programming language and run in cooperation with any hardware device. The system may be used for enterprises as small as a private home or business with just a few lines as well as for large enterprises with multiple PBX locations around the world, interconnected in one or more private networks or virtual private networks. In the case where multiple extensions are involved, it is understood that the extensions may be PBX extensions or direct line extensions.

Although illustrative embodiments of the invention have been shown and described, it is understood that a wide range of modifications, changes and substitutions are intended in the foregoing disclosure, including various encryption engines, encryption algorithms, compression algorithms, resulting word block sizes, key exchange schemes, DS-0 channel sample configuration and content, and methods of autodiscovery. In some instances, some features of the invention will be employed without a corresponding use of other features. Accordingly, it is appropriate that the appended claims be construed broadly and in a manner consistent with the scope of the invention.

What is claimed is:

1. A virtual private switched telecommunications network system for providing encrypted transport of a call across a public switched telephone network (PSTN) from a first enterprise location to a second enterprise location, said network system being located between one or more end-user stations at the first enterprise location and one or more end-user stations at the second enterprise location, said network system comprising:

at least one security rule in a database at the first enterprise location, said at least one security rule specifying at least one action to be performed based on at least one attribute of an incoming or of an outgoing call to/from the first enterprise location;

at least one security rule in a database at the second enterprise location, said at least one security rule specifying at least one action to be performed based on at least one attribute of an incoming or of an outgoing call to/from the second enterprise location;

at least one first telephony appliance associated with said database at the first enterprise location;

at least one second telephony appliance associated with said database at the second enterprise location;

said at least one first telephony appliance and said at least one second telephony appliance including means for determining said at least one attribute of an incoming or outgoing call, said at least one attribute of the incoming or outgoing call being selected from a group including: call direction, call source number, call destination number, call type, call date, call time, and call duration, said call type attribute being defined as one of voice, fax, or data transfer (modem);

said at least one first telephony appliance and said at least one second telephony appliance each further including means for individually performing said at least one action specified in the at least one security rule defined in its associated database, said at least one action being based upon said at least one determined attribute of the incoming or outgoing call, said at least one action being selected from a group including: allowing the call, denying the call, conducting the call in encrypted mode, sending a tone, sending a message, logging the call, generating a report, and providing an alert;

wherein said action of conducting the call in encrypted mode is provided without encrypting actions being taken by either the calling party using the one or more end-user stations within the first enterprise location or by the called party using the one or more end-user stations within the second enterprise location.

2. The network system as defined in claim 1 wherein said group of call attributes further includes: the identifier for the extension or direct connect line carrying the call; the PBX trunk group through which the call is processed; the channel through which the call is processed; the start date of the call; the start time of the call; the digits dialed prior to call connection; the digits dialed prior to the base phone number; the digits dialed after the base phone number; the caller ID identifier; the call connect time; the keywords detected; the digits dialed after call connect; the date call ended; and the time of day call ended.

3. The network system as defined in claim 2 wherein said action of conducting the call in encrypted mode is automatically performed on all inbound and outbound calls when at least one attribute of an inbound or outbound call is determined by either of said first telephony appliance or said second telephony appliance.

4. The network system as defined in claim 1 further including means for performing at least one additional action responsive to the success or failure of said action of conducting the call in encrypted mode, said at least one additional action being selected from a group including: allowing the call, denying the call, sending a tone, sending a message, adjusting the security policy, logging the call, generating a report, and providing an alert.

5. The network system as defined in claim 4 wherein the configuration of said at least one security rule includes defining two or more groups of one or more end-user stations, said two or more groups of one or more end-user stations having at least one feature in common, and said additional action of adjusting the security policy includes moving an end-user station from a first one of said two or more groups of end-user stations to a second one of said two or more groups of end-user stations.

6. The network system as defined in claim 1 wherein said action of conducting the call in encrypted mode includes creation of a VoIP-compatible packet for transport over the PSTN.

7. The network system as defined in claim 1 further including a public branch exchange (PBX) located at either the first or second enterprise location between the one or more end-user stations and the PSTN, and further including means for said PBX to determine and provide one or more call attributes of an incoming or outgoing call to said at least one first telephony appliance or said at least one second telephony appliance for use by said at least one first telephony appliance or said at least one second telephony appliance in performing said at least one action to be based on said at least one determined call attribute of the incoming or outgoing call.

8. The network system as defined in claim 7 further including means for said PBX to be tasked by said at least one first telephony appliance or said at least one second telephony appliance to perform one or more select actions specified in said least one security rule at either the first enterprise location or the second enterprise location.

9. A method for providing encrypted transport of a call across a public switched telephone network (PSTN) from/to a first enterprise location and from/to a second enterprise location, said method being implemented between one or more end-user stations located at either the first or the second enterprise locations, said method comprising the steps of:

defining at least one security rule applicable at the first enterprise location;

defining at least one security rule applicable at the second enterprise location;

said at least one security rule applicable at the first enterprise location specifying at least one action to be performed on a call based on at least one attribute of the call;

said at least one security rule applicable at the second enterprise location specifying at least one action to be performed on a call based on at least one attribute of the call;

detecting and analyzing the call to determine said at least one attribute of the call, wherein said at least one attribute of the call is selected from a group including: call direction, call source number, call destination number, call type, call date, call time, and call duration, said call type attribute being defined as one of voice, fax, or data transfer (modem);

performing said at least one action on the incoming or outgoing call at the first enterprise location and the second enterprise location based upon said at least one attribute of the call, said at least one action being specified in said at least one security rule at the first enterprise location or said at least one security rule at the second enterprise location, wherein said at least one action is selected from a group including: allowing the call, denying the call, conducting the call in encrypted mode, sending a tone, sending a message, logging the call, generating a report, and providing an alert;

wherein said action of conducting the call in encrypted mode is provided without encrypting actions being taken by either the calling party using the one or more end-user stations within the first enterprise location or by the called party using the one or more end-user stations within the second enterprise location.

10. The method as defined in claim 9 wherein said call attributes in said step of detecting and analyzing the call further includes the attributes: the identifier for the extension or direct connect line carrying the call; the PBX trunk group through which the call is processed; the channel through which the call is processed; the start date of the call; the start time of the call; the digits dialed prior to call connection; the digits dialed prior to the base phone number; the digits dialed after the base phone number; the caller ID identifier; the call connect time; the keywords detected; the digits dialed after call connect; the date call ended; and the time of day call ended.

11. The method as defined in claim 9 wherein said action of conducting the call in encrypted mode may be automatically performed on all inbound and outbound calls when at least one attribute of an inbound or outbound call is determined by either a first telephony appliance at the first enterprise location or a second telephony appliance at the second enterprise location.

12. The method as defined in claim 9 further including the step of performing at least one additional action responsive to the success or failure of said action of conducting the call in encrypted mode, said at least one additional action being selected from a group including: allowing the call, denying the call, sending a tone, sending a message, adjusting the security policy, logging the call, generating a report, and providing an alert.

13. The method as defined in claim 12 wherein said step of defining at least one security rule applicable at the first enterprise location or said step of defining a security rule applicable at the second enterprise location includes defining two or more groups of one or more end-user stations, said two or more groups of one or more end-user stations having at least one feature in common, and said additional action of adjusting the security policy includes moving an end-user station from a first one of said two or more groups of end-user stations to a second one of said two or more groups of end-user stations.

14. The method as defined in claim 9 wherein said action of conducting the call in encrypted mode includes creating a VoIP-compatible packet for transport over the PSTN.

15. The method as defined in claim 9 wherein said step of detecting and analyzing the call to determine said at least one attribute of the call includes a public branch exchange (PBX) located at either the first or second enterprise location between the one or more end-user station and the PSTN, wherein said PBX determines and provides one or more call attributes of an incoming or outgoing call, said call attributes being the basis for at least one action to be performed on the incoming or outgoing call.

16. The method as defined in claim 15 wherein said step of performing said at least one action on the incoming or outgoing call at the first enterprise location and the second enterprise location based upon said at least one attribute of the call may be performed by said PBX responsive to tasking by a telephony appliance associated with the first or second enterprise location containing the PBX.

17. A method of providing encrypted transport of a call from a first geographically separate location, across a public switched telephone network (PSTN), to a second geographically separate location, said method comprising the steps of:

defining at least one rule applicable to one or more end-user stations located at the first geographically separate location, said at least one rule specifying one or more actions to be performed based upon at least one attribute of an incoming call to or of an outgoing call from said one or more end-user stations located at the first geographically separate location;

defining at least one rule applicable to one or more end-user stations located at the second geographically separate location, said at least one rule specifying one or more actions to be performed based upon at least one attribute of an incoming call to or of an outgoing call from said one or more end-user stations located at the second geographically separate location;

determining said at least one attribute of an incoming call to or of an outgoing call from said one or more end-user stations located at the first geographically separate location;

determining said at least one attribute of an incoming call to or of an outgoing call from said one or more end-user stations located at the second geographically separate location;

performing said one or more actions on the incoming call to or on the outgoing call from said one or more end-user stations located at the first geographically separate location, in accordance with said at least one rule applicable to one or more end-user stations located at the first geographically separate location; and performing said one or more actions on the incoming call to or on the outgoing call from said one or more end-user stations located at the second geographically separate location, in accordance with said at least one rule applicable to one or more end-user stations located at the second geographically separate location; and;

said at least one attribute of the incoming call to or of the outgoing call from the one or more end-user stations being selected from a group including: call direction, call source number, call destination number, call type, call date, call time, and call duration, said call type attribute being defined as one of voice, fax, or data transfer;

wherein said one or more actions is selected from a group including: allowing the call, denying the call, conducting the call in encrypted mode, sending a tone, sending a message, logging the call, generating a report, and providing an alert;

wherein said action of conducting the call in encrypted mode is provided without encrypting actions being taken by either the calling party using the one or more end-user stations within the first enterprise location or by the called party using the one or more end-user stations within the second enterprise location.

18. The method as defined in claim 17 wherein said step determining said at least one attribute of an incoming call to or of an outgoing call further includes the attributes: the identifier for the extension or direct connect line carrying the call; the PBX trunk group through which the call is processed; the channel through which the call is processed; the start date of the call; the start time of the call; the digits dialed prior to call connection; the digits dialed prior to the base phone number; the digits dialed after the base phone number; the caller ID identifier; the call connect time; the keywords detected; the digits dialed after call connect; the date call ended; and the time of day call ended.

19. The method as defined in claim 17 wherein said action of conducting the call in encrypted mode may be automatically performed on all inbound and outbound calls when at least one attribute of an inbound or outbound call is determined by either a first telephony appliance at the first enterprise location or a second telephony appliance at the second enterprise location.

20. The method as defined in claim 9 further including the step of performing at least one additional action responsive to the success or failure of said action of conducting the call in encrypted mode, said at least one additional action being selected from a group including: allowing the call, denying the call, sending a tone, sending a message, adjusting the security policy, logging the call, generating a report, and providing an alert.

21. The method as defined in claim 9 wherein said action of conducting the call in encrypted mode includes creating a VoIP-compatible packet for transport over the PSTN.

* * * * *